US006217444B1

(12) United States Patent
Kataoka et al.

(10) Patent No.: US 6,217,444 B1
(45) Date of Patent: Apr. 17, 2001

(54) SIMULATIVE GOLF GAME SYSTEM AND A METHOD FOR PROVIDING A SIMULATIVE GOLF GAME AND A STORAGE MEDIUM FOR STORING A SIMULATIVE GOLF GAME PROGRAM

(75) Inventors: Hideki Kataoka; Shinya Inoue, both of Kobe (JP)

(73) Assignee: Konami Co., Ltd., Hyogo-ken (JP)

( * ) Notice: Subject to any disclaimer, the term of this patent is extended or adjusted under 35 U.S.C. 154(b) by 0 days.

(21) Appl. No.: 08/935,017

(22) Filed: Sep. 22, 1997

(30) Foreign Application Priority Data

Sep. 24, 1996 (JP) .................................................. 8-251815

(51) Int. Cl.⁷ .......................................................... A63F 9/22
(52) U.S. Cl. .............................................. 463/3; 434/252
(58) Field of Search ........................................ 473/409, 225, 473/219, 220, 221, 222, 266, 270; 434/252; 463/40, 41, 42, 4, 3

(56) References Cited

U.S. PATENT DOCUMENTS

| | | | |
|---|---|---|---|
| 4,504,055 | * 3/1985 | Wells ......................................... | 463/3 |
| 5,118,112 | 6/1992 | Bregman et al. . | |
| 5,146,557 | * 9/1992 | Yamrom et al. ........................... | 463/3 |
| 5,154,427 | * 10/1992 | Harlan et al. ........................... | 473/222 |
| 5,269,519 | * 12/1993 | Malone ..................................... | 463/3 |
| 5,398,936 | * 3/1995 | Kluttz et al. ........................... | 434/252 |
| 5,435,554 | 7/1995 | Lipson . | |
| 5,474,298 | * 12/1995 | Lindsay ................................. | 473/222 |
| 5,772,522 | * 6/1998 | Nesbit et al. ........................... | 473/222 |

FOREIGN PATENT DOCUMENTS 0686944  12/1995 (EP) .

OTHER PUBLICATIONS

Access Software, Inc., The History of Links [online]. Description of all of the Links games from 1989 to present. 1999 [retrieved Mar. 26, 2000] Retrieved from the Internet URL: http://accessoftware.com/ctg/aboutus/corpinfo/link-shist.html.*

Access Software, Inc., Links the Challenge of Golf[online]. Description of 1989 game. 1999 [retrieved Mar. 26, 2000] Retrieved from the Internet URL: http://accessoftware.com/ctg/golf/sims/challenge/main.cgi.*

Access Software, Inc., Links Pro CD[online]. Description of 1985 game, with link to downloadable manual. 1999 [retrieved Mar. 26, 2000] Retrieved from the internet URL: http://accessoftware.com/ctg/golf/sims/lprocd/main.cgi.*

Access Software, Links 386 386CD Players manual, pp 3–5, 9, 10, 27, 40, 87, 1995.*

Yamron B., Lorensen W.E..: "X, Golf and Object–Oriented Programming" Technology of Object–Oriented Languages and Systems. Proceedings of the Second International Conference, Jun. 25–29, 1990, Paris pp. 443–454, XP002064538.

* cited by examiner

*Primary Examiner*—Jessica J. Harrison
(74) *Attorney, Agent, or Firm*—Jordan and Hamburg LLP

(57) ABSTRACT

A simulative golf game system provides a game image having a guide image indicating a stance setting, enabling the game player to easily recognize based on which stance is used, how the game is going to play. The guide image represents a power meter whose scale increases and decreases according to a spacing between the feet. The foot spacing determines the power applied to the shot and influences the flying distance of the golfball, thereby making the game more real.

21 Claims, 18 Drawing Sheets

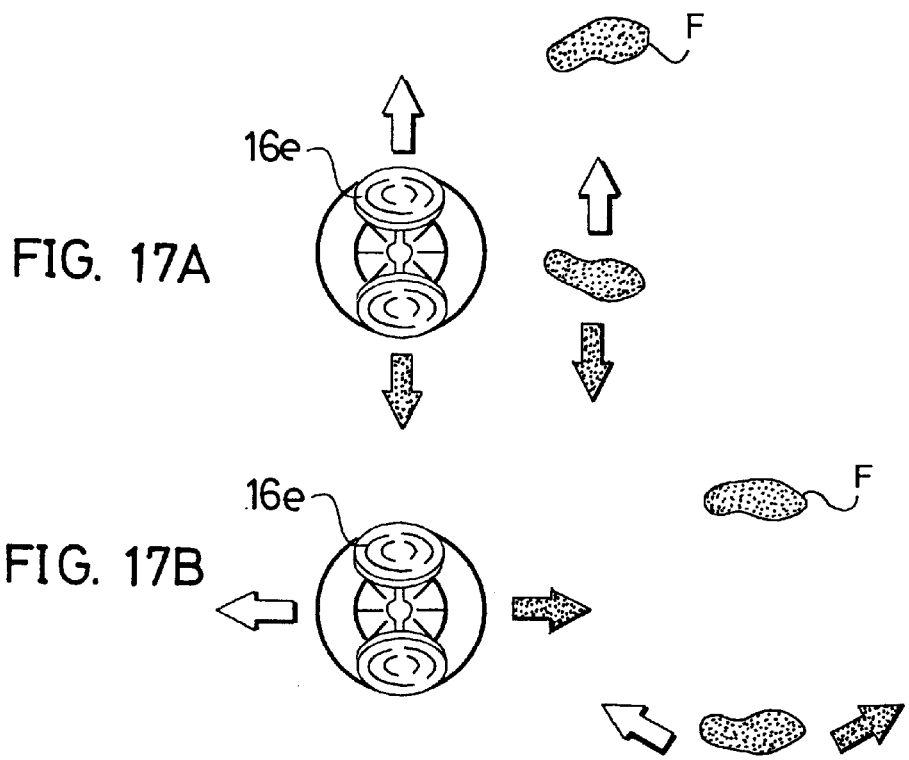
FIG. 17A
FIG. 17B
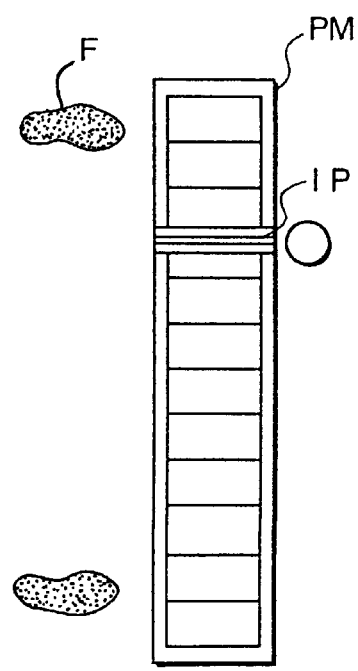
FIG. 18A
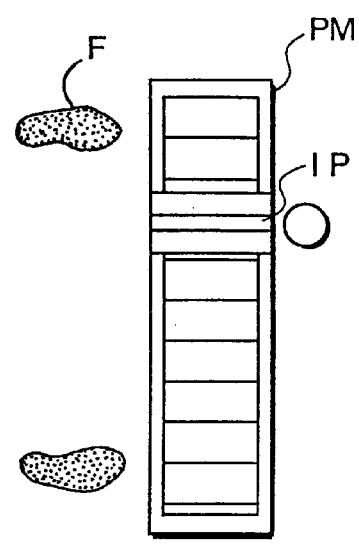
FIG. 18B

SIMULATIVE GOLF GAME SYSTEM AND A METHOD FOR PROVIDING A SIMULATIVE GOLF GAME AND A STORAGE MEDIUM FOR STORING A SIMULATIVE GOLF GAME PROGRAM

BACKGROUND OF THE INVENTION

The present invention relates to a simulative golf game system, a method for providing a simulative golf game, and a computer readable storage medium, such as optical disk, magnetic disk, cassette type storage medium including semiconductor memory, for storing a simulative golf game program.

Many simulative game systems have been proposed. These systems are generally grouped into personal-use systems comprised of a special home appliance and a television monitor, and commercial-use systems comprised of special commercial equipment, a personal computer or work station, a display and an audio output machine. Any of these systems is provided with a controller operable by a player, a storage medium in which a game program is stored, a CPU for controlling generation of audio sounds and images based on the game program, a processor for generating images, a processor for generating audio sounds, a CRT for displaying the images, and a speaker for outputting the audio sounds. CD-ROMs, semiconductor memories and cassettes having built-in semiconductor memories are frequently used as a storage medium.

The screen image construction of such a simulative game is described below. Although there are many kinds of simulative game, most roughly speaking, the simulative game screen image includes a controllable object image which changes according to an operation of the controller and a background image which is still or suitably changes according to the operated state of the object. The background image may be further classified into one which gives a game player a visual change, i.e., mere background, and one which is used as conditions to obtain an outcome, e.g., points, for the game player.

As one of such simulative games, there are simulative golf games. In a simulative golf game, usually, by displaying an image of a golf course and an image of a golfer on a display screen of a television monitor, a golf game space is formed on the display screen. The golfer in the golf game space is visually moved according to an operation of a controller by the game player, and a golfball is driven by a club held by the golfer. The driven ball visually flies in a direction of depth in the golf game space. In other words, golf is simulatively and visually executed in the golf game space in the same manner as man actually plays. In short, golf is visually executed by suitably changing images displayed on the television monitor according to the operation of the controller by the game player.

The image of the golf course is related to the height data of the golf course. Based on the operation of the controller by the game player and the height data of the golf course, how far the golfball is going to be moved in the golf game space is calculated, and this calculation result is displayed as an image. For example, the golf ball is displayed in such a manner that it moves on the image information, representing the configuration of the golf course according, to the operation by the golf player.

As described above, the game player can simulatively and visually enjoy the golf game by operating the controller. However, there is a demand for more a realistic golf game. For example, in actual golf, the trajectory of a golfball largely changes depending upon a stance. It will be seen that the golf game becomes more real if the golfball trajectory changes with a variation in the stance.

SUMMARY OF THE INVENTION

It is an object of the present invention to provide a simulative golf game system and a method for providing a simulative golf game which overcome the problems residing in the prior art.

It is another object of the present invention to provide a simulative golf game system and method which can assure a more realistic golf game.

It is another object of the present invention to provide a computer readable storage medium which stores a simulative golf game program capable of providing a more realistic golf game.

According to an aspect of the present invention, a simulative golf game system comprises an operation unit for generating an operation signal controlling a stance setting in accordance with an operation of a player, a game image producing unit for producing a game image having a guide image representing a stance setting in accordance with an operation signal from the operation unit, and a display unit for displaying a generated game image having a guide image.

According to another aspect of the present invention, a method for providing a simulative golf game in a system provided with an operation unit to be operated by a player to generate an operation signal and a display unit on which a game image is displayed is provided. The method comprises the steps of receiving an operation signal controlling a stance setting from the operation unit, generating a game image having a guide image representing a stance setting in accordance with the operation signal, and displaying a produced game image having a guide image indicating a stance setting.

According to still another aspect of the present invention, a computer readable storage medium storing a simulative golf game program which renders a computer to execute the procedures of receiving an operation signal controlling a stance setting from an operation unit to be operated by a player, producing a game image having a guide image indicating a stance setting in accordance with the operation signal, and displaying a generated game image having a guide image indicating a stance setting a display unit.

A simulative golf game system of the present invention provides a game image having a guide image indicating a stance setting which is adjusted by the game player. Accordingly, the game player can easily recognize based on which stance is effected how the game is going play and feel more as if he were actually playing golf

BRIEF DESCRIPTION OF THE DRAWINGS

FIGS. 17A and 17B are diagrams showing a relationship between an analog stick and a stance;

FIGS. 18A and 18B are diagrams showing a relationship between a stance width and a power meter.

DETAILED DESCRIPTION OF THE PREFERRED EMBODIMENTS OF THE INVENTION

Figure 15:
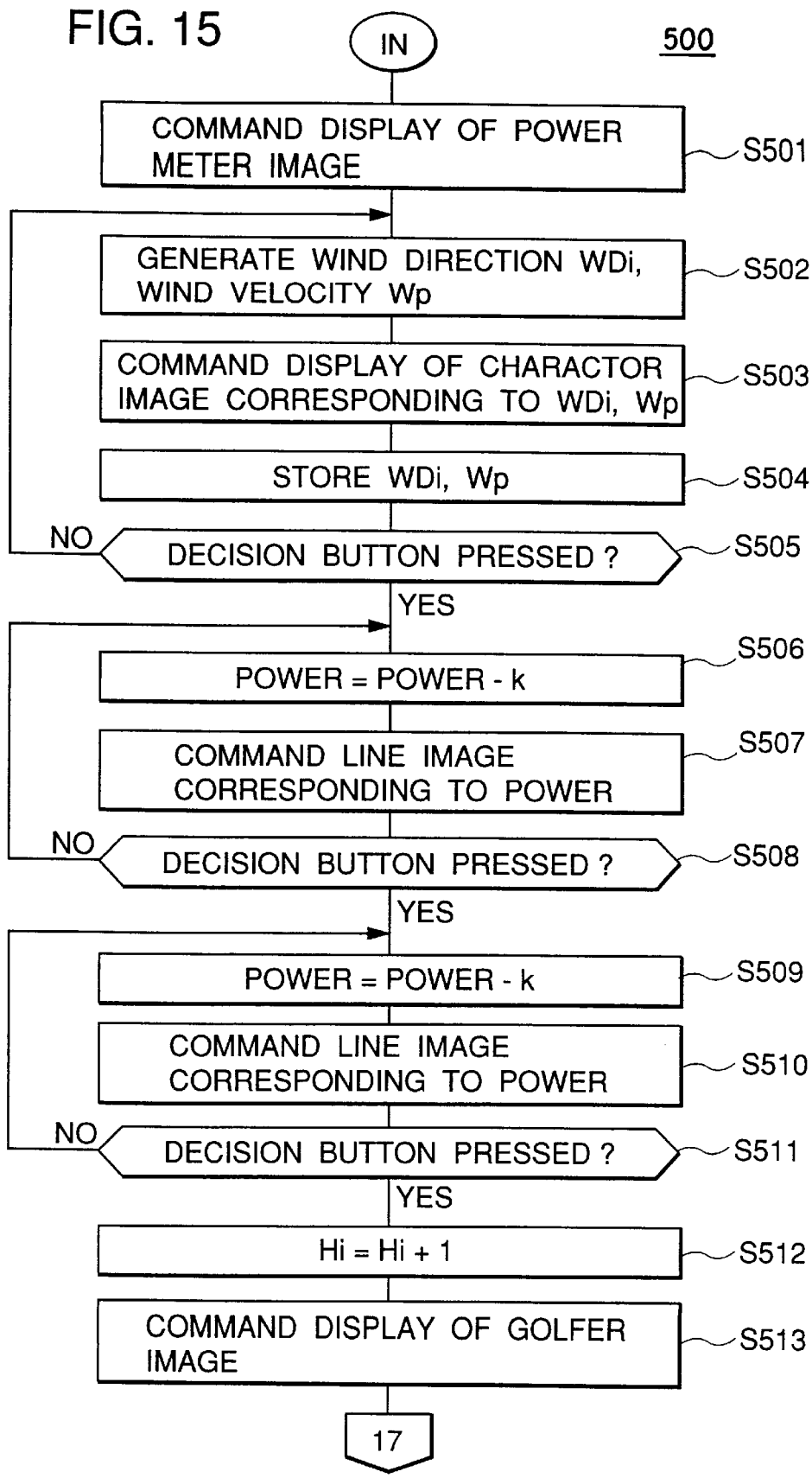
FIGS. 15 and 16 are flowcharts showing an operation sequence of a stroke routine.
Figure 16:
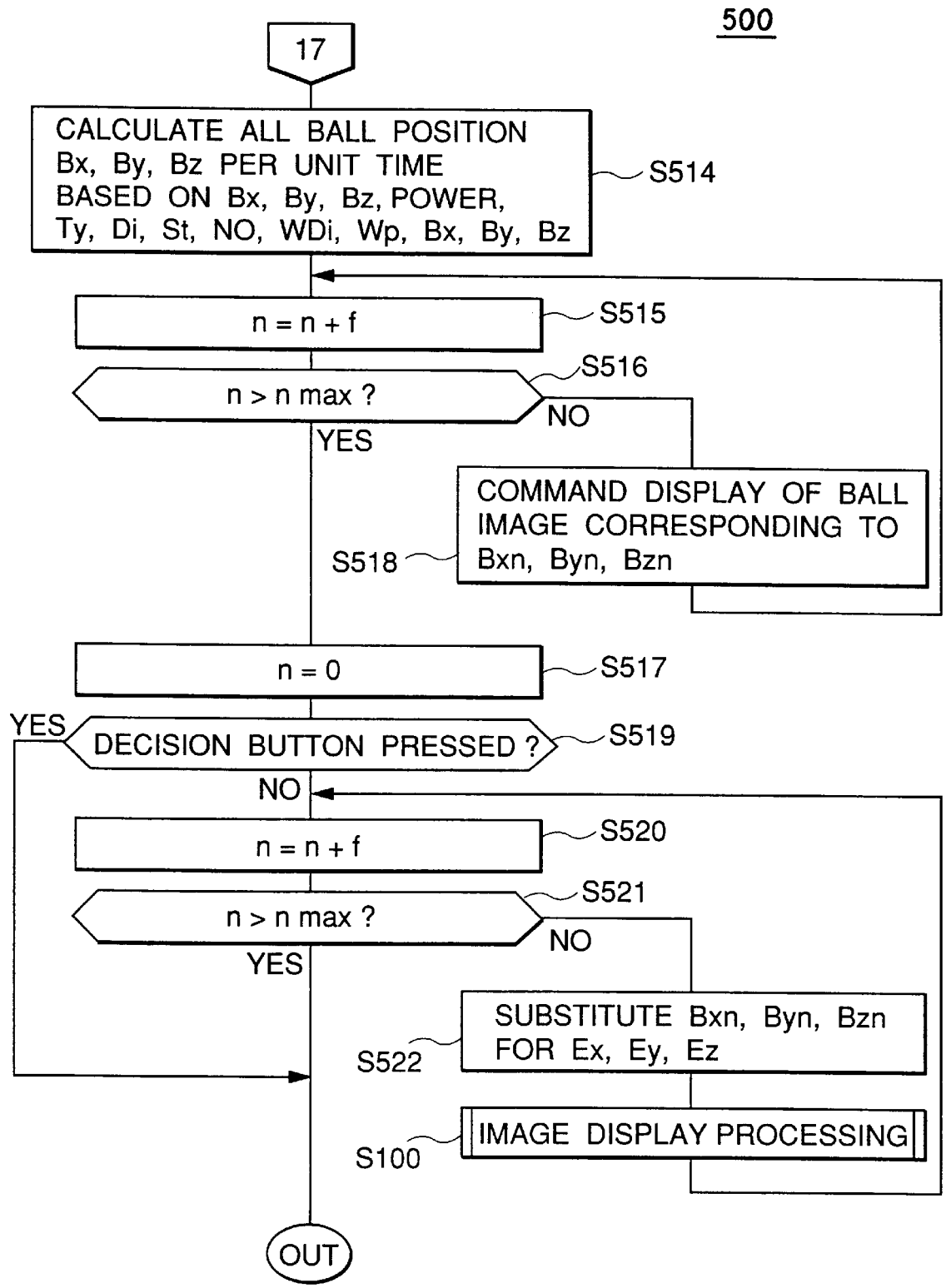

An embodiment of the invention is described below in accordance with the following items:

A. Construction of Game System (FIG. 1)
B. Operations of CPU of Game System (FIG. 2)
C. Display of Golf Screen (FIG. 3)
D. Main Routine (FIGS. 4 to 6)
E. Stance Setting Routine (FIGS. 7 and 8)
F. Stance Width Setting Routine (FIGS. 9 and 10)
G. Ball Position Setting Routine (FIGS. 11 and 12)
H. Club Setting Routine (FIGS. 13 and 14)
I. Hitting Routine (FIGS. 15 and 16)

A. Construction of Game System

Figure 1:
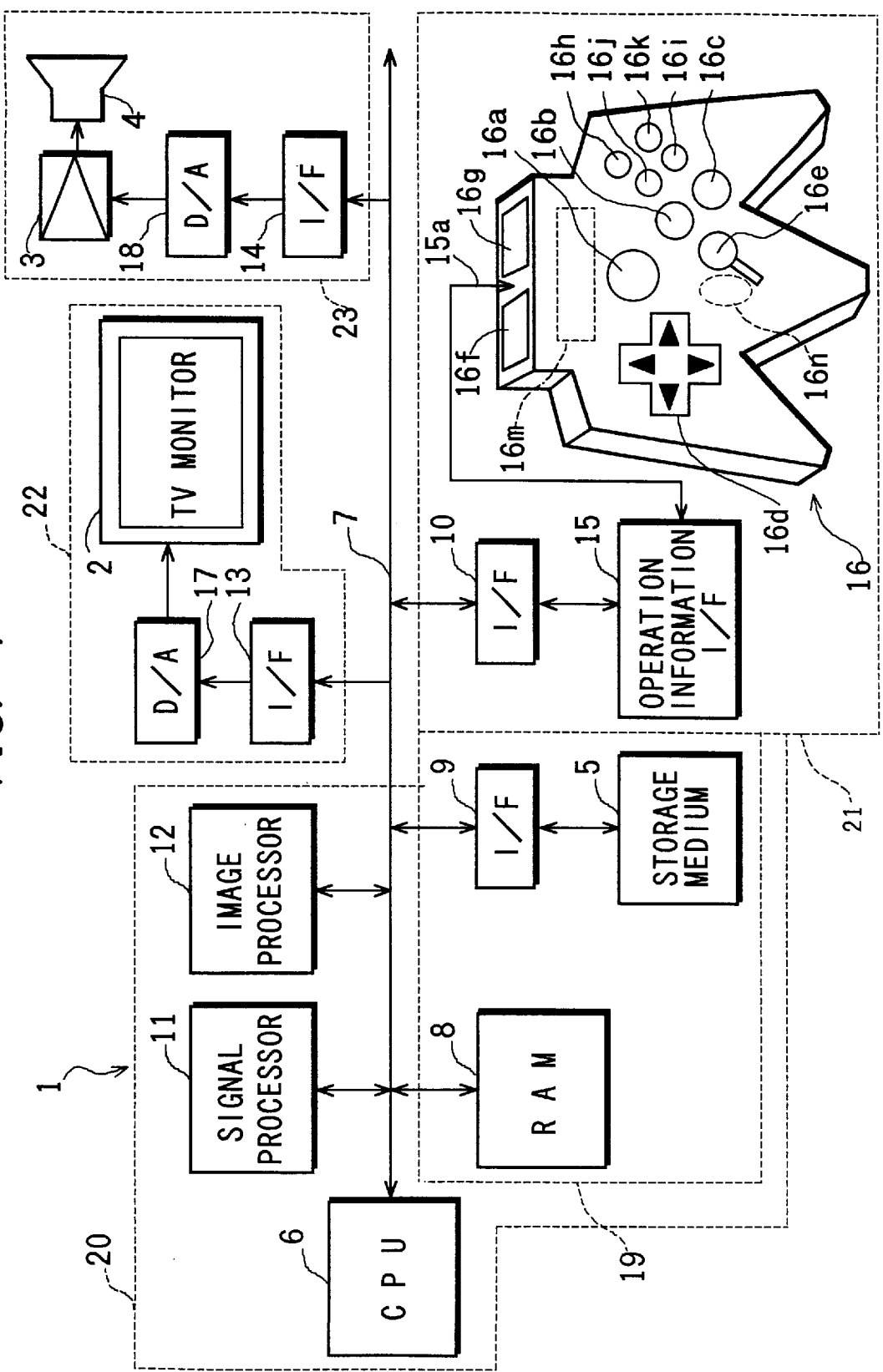
FIG. 1 is a block diagram showing a construction of a simulative golf game system embodying the present invention.

FIG. 1 shows an overall construction of a simulative golf game system according to one embodiment of the invention. The game system includes a main unit 1, a television monitor 2 for displaying images of a game, an amplifying circuit 3 and a speaker 4 for outputting audio sounds of the game, and a storage medium 5 for storing a game program and game data in connection with images, and audio sounds. In this embodiment, as the storage medium 5 a so-called ROM cassette, optical disk, flexible disk, or the like, in which the above-mentioned program and game data are recorded is used.

The main unit 1 has buses 7 including an address bus, a data bus and a control bus that are connected to a CPU 6. The buses 7 interconnect a RAM 8, interface circuits 9, 10, a signal processor 11, an image processor 12, and interface circuits 13, 14. The interface circuit 10 connects a controller 16 via an operation information interface circuit 15. Digital-to-analog (D/A) converters 17, 18 are connected via the interface circuits 13, 14, respectively, to the buses 7.

A memory portion 19 is defined by the RAM 8, the interface circuit 9 and the storage medium 5. A controlling portion 20 is defined by the CPU 6, the signal processor 11 and the image processor 12 to control the progress of the game. An operable input portion 21 is defined by the interface circuit 10, the operation information interface circuit 15 and the controller 16. An image display portion 22 is defined by the television monitor 2, the interface circuit 13 and the D/A converter 17. An audio output portion 23 is defined by the amplifying circuit 3, the speaker 4, the interface circuit 14 and the D/A converter 18.

The game system is changeable depending on its application. Specifically, in the case that the game system is applied for home use, the television monitor 2, the amplifying circuit 3 and the speaker 4 are arranged separately from the main unit 1. FIG. 1 shows an arrangement for the home use.

In the case that the game system is applied for commercial use, all the elements shown in FIG. 1 are integrally assembled in a single housing.

In the case that the game system is used in combination with a personal computer or a work station computer, the television monitor 2 may be replaced with a monitor of the computer. The function of the image processor 12 may be accomplished by a part of the game program stored in the storage medium 5 or hardware on an extensible board mounted on an extensible slot of the computer. The function of the RAM 8 may be accomplished by a memory of the computer or of an extensible memory. Also, in this case, the interface circuits 9, 10, 13, 14, the D/A converters 17, 18, the operation information interface circuit 15 correspond to the hardware on the extensible board mounted on the extensible slot of the computer.

The signal processor 11 mainly executes calculations in a three-dimensional space, calculations for transformation of positions in the three-dimensional space into positions in a pseudo three-dimensional space, light source calculation processing, generation of audio data and other processing.

The image processor 12 executes, based on calculation results of the signal processor 11, processing of writing image data to be displayed into the RAM 8, e.g., writing texture data in an area of the RAM 8 designated for a polygon.

The controller 16 includes a start button 16a, A-button 16b, B-button 16c, a cross key 16d, an analog stick 16e, a left trigger button 16f, a right trigger button 16g, a C1-button 16h, a C2-button 16i, a C3-button 16j, a C-4 button 16k, a connector 16m and a depth trigger button 16n, A memory for temporarily storing progress of the game or the like is detachably connectable by the connector 16m. The analog stick 16e is operable not only to the above, the below, the left and the right, but also in any direction, and functions substantially similar to a joy stick.

Operations of the simulative game system are described below. A power switch (not shown) is turned on to activate the game system. At this time, the CPU 6 reads images, audio sounds and the game program from the storage medium 5 in accordance with an operating system stored in the storage medium 5. A part or all of the read images, audio sounds and game program are stored in the RAM 8.

Thereafter, the CPU 6 executes the game based on the game program stored in the RAM 8 and content of an instruction which the game player gives via the controller 16. Specifically, the controller 16 suitably generates commands for outputting images and audio sounds based on the content of the instruction given from the game player via the controller 16.

The signal processor 11 performs calculation of a position of a character in the three-dimensional space (the same applies to a two-dimensional space) and the like, calculation of a light source, generation of audio data and other processing. Subsequently, the image processor 12 writes image data to be displayed into the RAM 8 based on calculation results. The image data written in the RAM 8 is sent to the D/A converter 17 via the interface circuit 13. After being converted into an analog video signal in the D/A converter 17, the image data is sent to the television monitor 2 and displayed as an image.

The audio data outputted from the signal processor 11 is sent to the D/A converter 18 via the interface circuit 4. After being converted into an analog audio signal in the D/A converter 18, the audio data is outputted as an audio sound from the speaker 4 via the amplifying circuit 3.

The simulative game system, which is constructed as described above, provides a series of game images where the result of a shot to be made is changed in accordance with a variation in the "spacing between feet", "direction of feet", or "the position of a golfball" when a golfer on the screen takes a stance. Specifically, the trajectory of the golfball is changed in accordance with a foot position with respect to the golfball or golfball position. A determined spacing between the feet influences shot power and flying distance of the golfball. The foot direction influences a flying course of the golfball.

Further, the shot power is represented by a power meter. The representation of the power meter is changed in accordance with a variation in the spacing between the feet. In the case of taking a wide stance, an increased power meter is displayed, thus enabling a longer flying period. However, in this case, an impact timing range representing an impact timing is narrowed, which thus increases a degree of impact timing difficulty. On the other hand, in the case of taking a narrow stance, a decreased power meter is displayed, thus lowering a possibility of a long flying period whereas the impact timing range IP is widened to provide easier impact timing.

B. Operations of CPU (FIG. 2)

Figure 2:
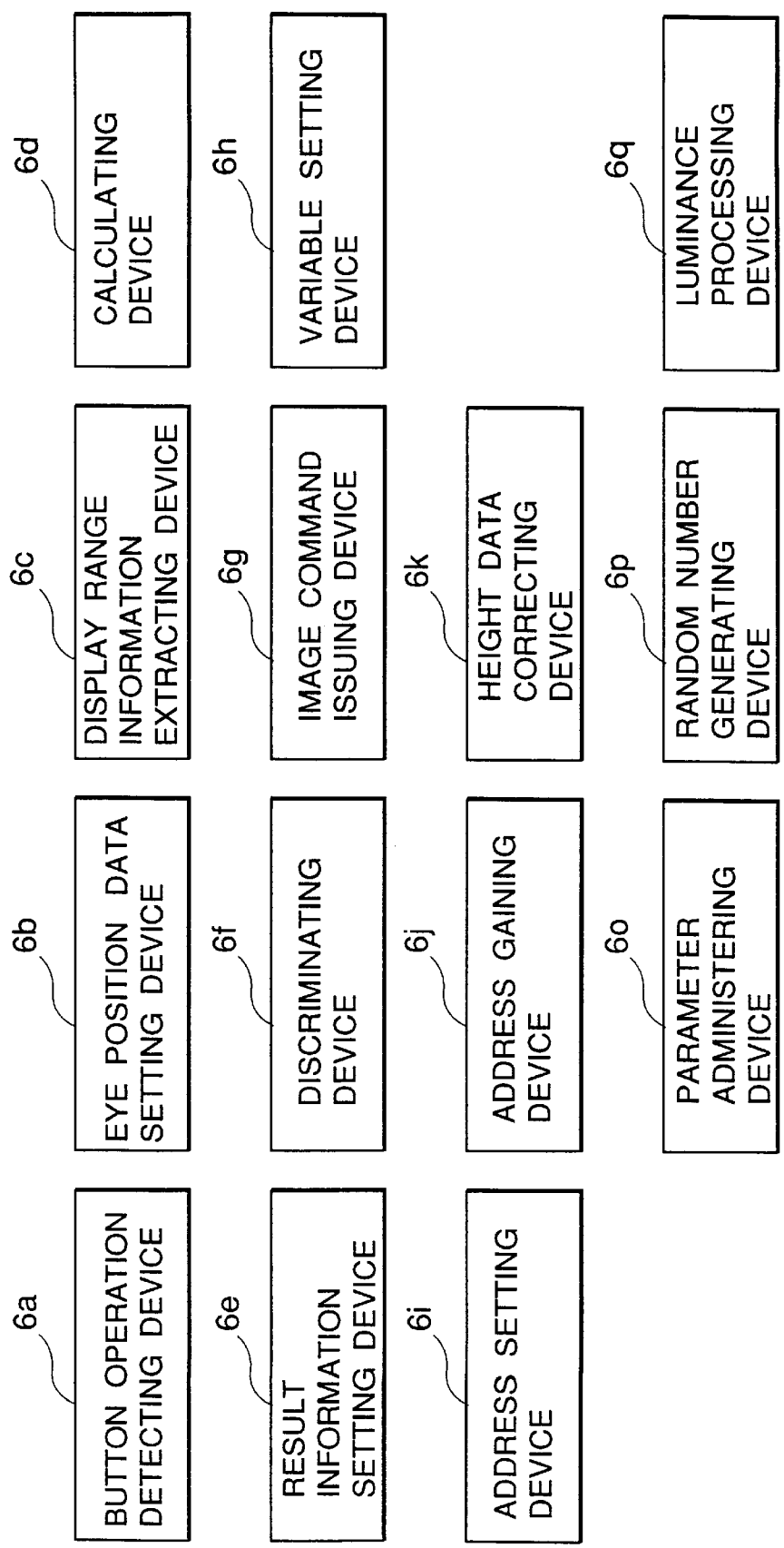
FIG. 2 is a diagram showing an arrangement of operating devices in a CPU of the simulative golf game system.

FIG. 2 shows operating devices for executing a variety of function provided in the CPU 6 by the program which has been read from the storage medium 5 and then stored in the RAM 8. Specifically, there are provided a button operation detecting device 6a, an eye position data setting device 6b, a display range information extracting device 6c, a calculating device 6d, a result information setting device 6e, a discriminating device 6f, an image command issuing device 6g, a variable setting device 6h, an address setting device 6i, an address gaining device 6j, a height data correcting device 6k, a parameter administering device 60, a random number generating device 6p and a luminance processing device 6q. These operating devices accomplish operations described in the following items C to H.

C. Display of Golf Screen (FIG. 3).

Figure 3:
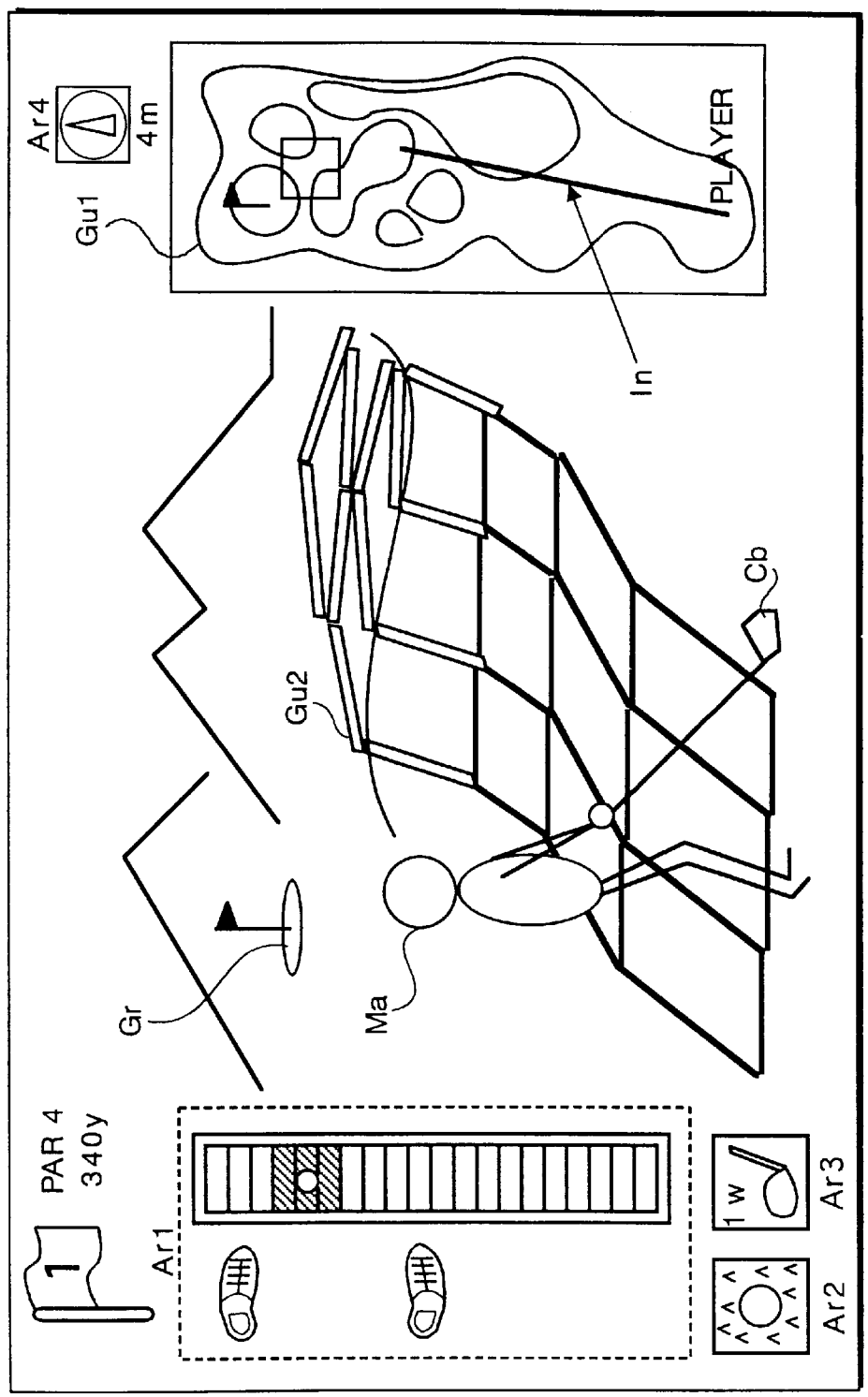
FIG. 3 is a diagram showing an example of screen display of the simulative golf game system.

FIG. 3 is a diagram showing an example of screen display. As shown in FIG. 3, the screen includes display areas for character information in upper left and upper right portions, areas Ar1, Ar2, Ar3, Ar4, and a display area for a golfer Ma and a hole (middle of FIG. 3) and a display area for a guide Gu1.

As shown in this example, a flag with a hole number, characters representing a specified number of strokes (PAR), and characters representing a remaining distance (340 y) are displayed in the upper left area Further, characters representing a velocity of wind and an image of an arrow indicating a direction of the wind are displayed in the area Ar4 located in the upper right portion.

In the area Ar1 are displayed images representing a direction of a stance, a stance width and a power meter. In this embodiment, the CPU 6 operates to change the scale of the power meter and an impact range IP when the cross key 16d, the analog stick 16e or the like are operated during display of this screen to change the stance width. The changed contents are displayed on the television monitor 2. In the area Ar2 are displayed images of a golfball and a ground. In the area Ar3 are displayed an image of a title of an item to be set, such as selection of a golf club, tee-up, or a drive position and an image of the item to be set (e.g., golf club). In the guide Gu1 is displayed an indicator image In for indicating the flying distance and position of the golfball. The display of the indicator image In is changed according to the above settings.

In the middle of the screen are displayed an image of the golfer Ma holding a golf club Cb, a landscape image of a hole including a green Gr and a guide Gu2 in a driving direction viewed from the position of the golfer Ma (or from the position of the ball). The guide Gu2 is in the form of a matrix in a plane, and is formed by a multitude of straight lines. The guide Gu2 is displayed along the driving direction from the position of the golfer Ma in a pseudo three-dimensional manner so as to conform to the configuration of the ground, i.e., similar to the configuration of the ground. The luminance of the guide Gu2 is variable according to the height of the ground located at respective areas. In this example, the higher the ground below the guide Gu2, the higher the luminance, and the lower the ground below the guide Gu2, the lower the luminance. Accordingly, the game player can discriminate the height of the ground and is enabled to play a game according to the configuration of the ground within the golf game space by, for example, increasing or decreasing the set value for the stroke using the controller 16.

The guide Gu2 is formed by connecting the respective apices of a polygon defining the configuration of the ground with a multitude of lines generated by the image processor 12 in accordance with a line image command. Since the line image command includes luminance data of the respective polygon apices, the image processor 12 determines the luminance of the line based on the luminance of the apex of the polygon corresponding to a starting point and the luminance of the apex of the polygon corresponding to an end point. For example, if the luminance of the starting point is higher than that of the end point, the luminance of the line is highest at the starting point and is gradually reduced toward the end point. It should be noted that such gradation is not expressed in the individual lines of FIG. 3 in order to facilitate the drawing.

Normally, height data is set for each part of the landscape. The image processor 12 calculates a light source based on this height data and the position of a virtual light source determined based on the eye position, and the luminance of each part of the landscape is determined based on the calculated light source. Accordingly, the distance and height can be expressed to a certain degree by displaying the landscape image. However, expressing the distance and height to the hole based only on a luminance difference obtained by the light source calculation, does not provide for sufficient operation of the controller 16 using only the luminance as a guidance. Accordingly, the guide Gu2 is displayed. The respective parts of the guide Gu2 are formed by the straight lines having the same length which are displayed in luminance corresponding to the height of the hole and in length corresponding to the distance. Thus, the distance and height of the hole can be more easily expressed. Therefore, the game player can operate the controller 16 so as to conform to the conditions of the hole within the game space.

D. Main Routine (FIGS. 4 to 6)

Figure 4:
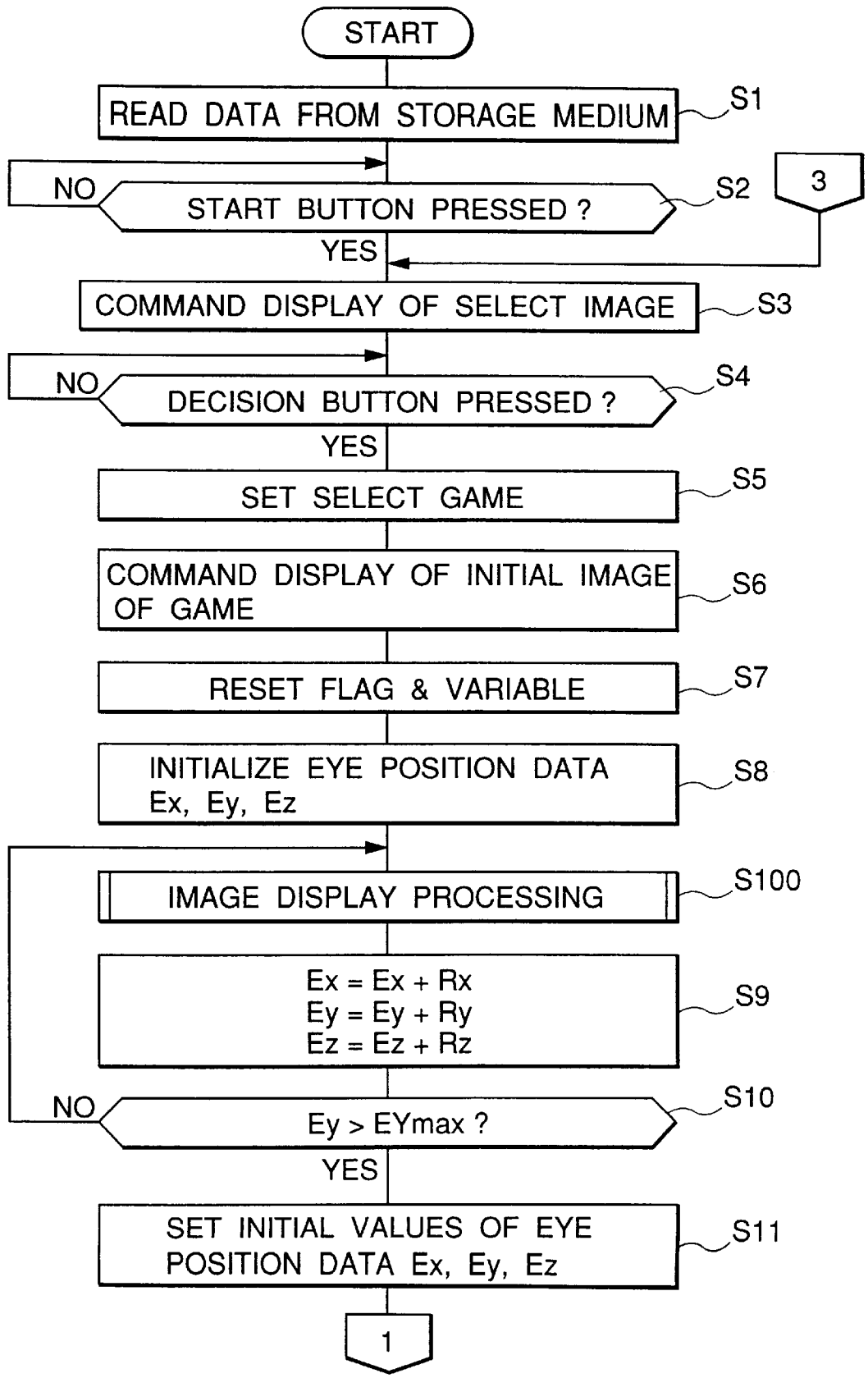
FIGS. 4 to 6 are flowcharts showing an operation sequence of a main routine of a game program.
Figure 5:
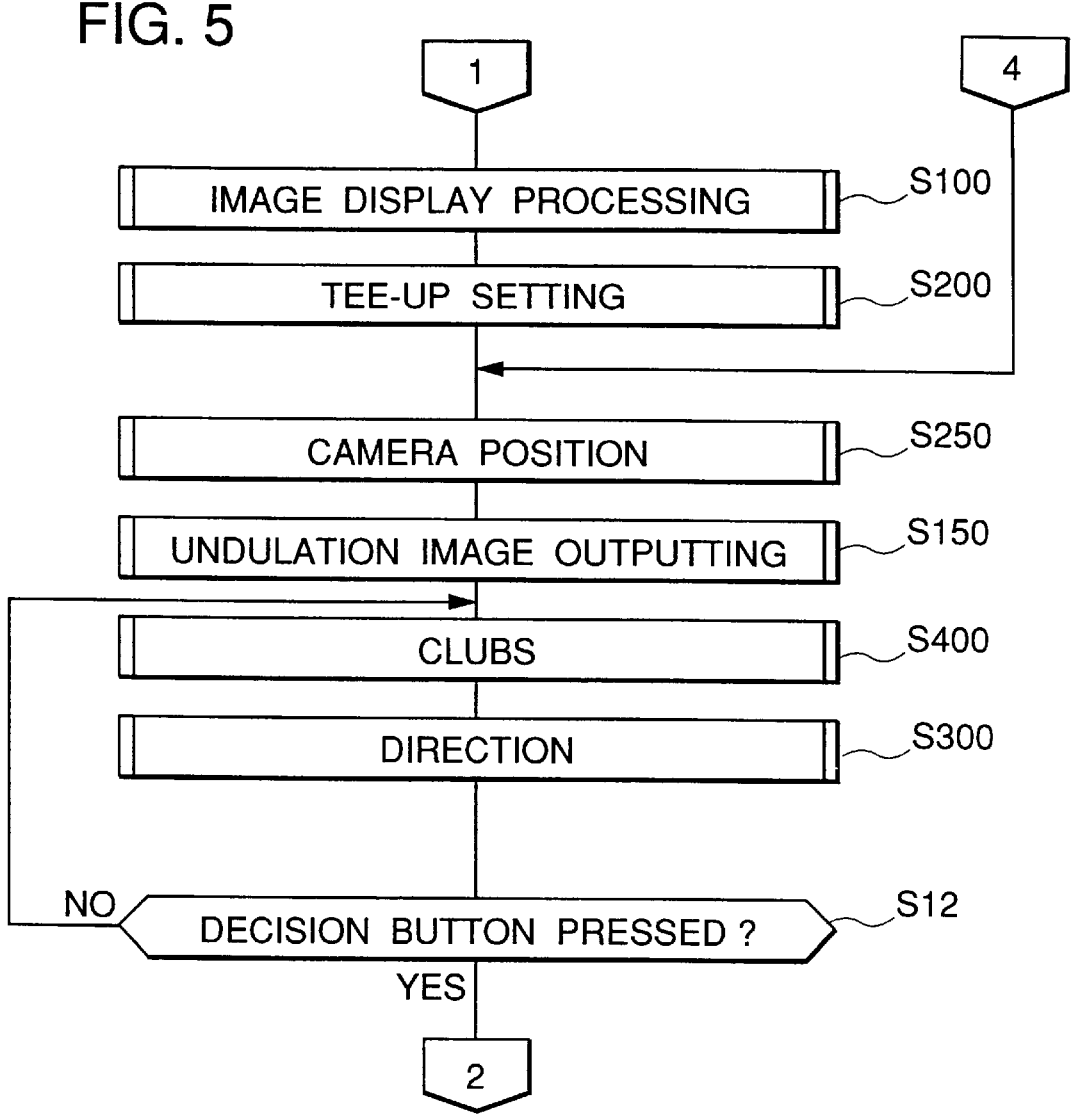
Figure 6:
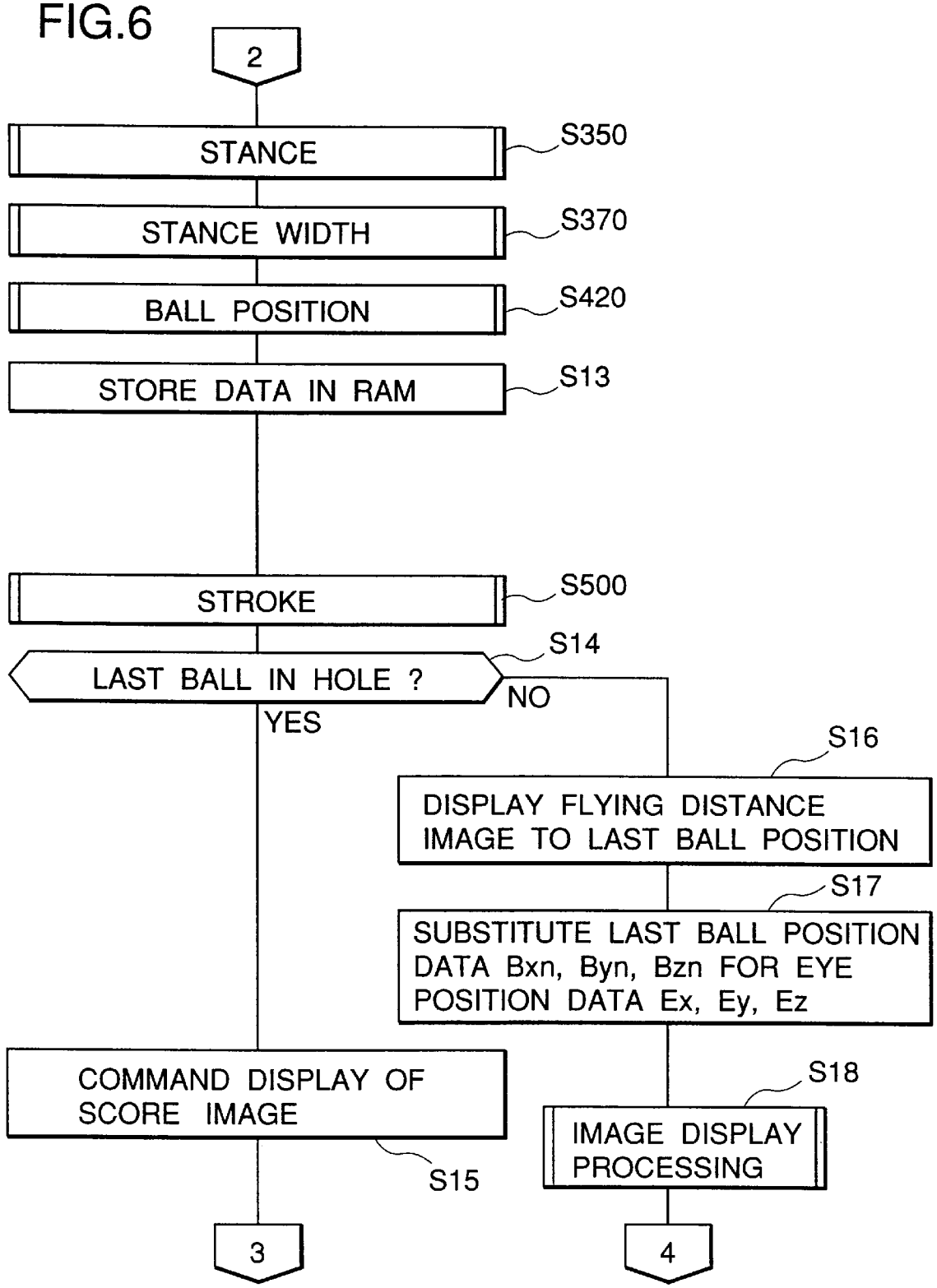

FIGS. 4 to 6 show a main routine of the simulative golf game system. Operations in accordance with the game program are mainly performed by the respective operating devices of the CPU 6 shown in FIG. 2 as described above.

In Step S1, the image data, audio sound data and program are read from the storage medium 5. The program is stored in the RAM 8, thereby enabling the CPU 6 to execute the respective operations of the operating devices shown in FIG. 2.

In Step S2, the button operation detecting device 6a discriminates whether the start button 16b of the controller 16 has been pressed. Step S3 follows if the discrimination result is "YES".

In Step S3 the image command issuing device 6g issues an image command, representing the display of a select image, to the image processor 12. The image processor 12 causes the image data of the select image to be displayed on the display surface of the television monitor 2.

In Step S4, the button operation detecting device 6a discriminates whether an A-button (hereinafter, "decision button") 16b of the controller 16 has been pressed. Step S5 follows if the discrimination result is "YES".

In Step S5 the CPU 6 sets a selected game. A desired game is selected by using the cross key 16d or the analog stick 16e while viewing the selection image displayed by Step S3 and then designated by pressing the decision button 16b. The term "game" includes not only the degree of difficulty but also the type of opponent characters. In Steps S3 to S5 in short, selectable items provided in the "game" are determined before the game is actually started.

In Step S6, the image command issuing device 6g issues to the image processor 12 an image command for the display of an initial image of the selected game. The image processor 12 in turn causes the initial image to be displayed on the display screen of the television monitor 2.

In Step S7, the variable setting device 6h resets flags and variables stored in the RAM 8.

In Step S8, the eye position data setting device 6b initializes values of eye position data Ex, Ey, Ez and guidance image data stored in the RAM 8, including a power meter PM and a stance width by, for example, setting address data representing the position of a teeing ground Tg of a hole, and defaults of the stance width and the stance direction.

In Step S100, an image display processing is performed. In the main routine, this processing is performed to display an image corresponding to the eye position data Ex, Ey, Ez and the guidance image data set in Step S8.

In Step S9, the calculating device 6d adds variables Rx, Ry, Rz (not constant) to the eye position data Ex, Ey, Ez The eye position data Ex, Ey, Ez represent a horizontal direction address, a vertical direction address and a height, respectively.

In Step S10, the discriminating device 6f discriminates whether the eye position data Ey exceeds a maximum value Eymax. Step S11 follows if the discrimination result is "YES", whereas Step S100 follows if it is "NO". By a loop of Steps S100 to S10, the image is displayed each time the value of the eye position data is changed, so as to display the hole for the game player as a guide.

In Step S11, the eye position data setting device 6b sets the initial values of the eye position data Ex, Ey Ez. Subsequently, the image display processing is performed in subsequent Step S100.

In Step S200, a tee-up setting processing is performed. "Tee-up Setting" here means the setting of a position where the golfball is teed off.

In Step S250, a camera position setting processing is performed. "Camera Position" here refers to a position where the images of the hole and the golfer are viewed from.

In Step S400, a club setting processing is performed. "Clubs" here refer to golf clubs including iron clubs and wood clubs. This club setting routine S400 is described in detail below.

In Step S300, a direction setting processing is performed. "Direction" refers to a direction in which the body of the golfer faces.

In Step S12, the button operation detecting device 6a discriminates whether the decision button 16b has been pressed. Step S350 follows if the discrimination result is "YES". Step S12 is a step which discriminates whether the direction setting by the direction setting routine S300 is completed. In other words, the main routine goes back to the direction setting routine S300 unless the game player presses the decision button 16b.

In Step S350 a stance setting processing is performed. "Stance" refers to the posture or position of the golfer. The stance setting routine S350 is described in detail below.

In Step S370, a stance width setting processing is performed. "Stance Width" refers to a spacing between the feet of the golfer and the positions of the feet with respect to the golfball. The stance width setting routine is described in detail below.

In Step S420, a ball position setting processing is performed in which the positions of the feet with respect to the ball, i.e., the "Ball Position".

In Step S13, stroke data and other data obtained in the stance setting routine, the stance width setting and the ball position setting routine are stored in the RAM 8.

In Step S500, a stroke processing is performed. In this processing, the image processing is performed for the driven ball, the landscape, and the like. The stroke routine S500, is described in detail below.

In Step S14, the discriminating device 6f discriminates whether the last ball position is a hole position. Step S15 follows if the discrimination result is "YES", whereas Step S16 follows if it is "NO". This discrimination is made because a subsequent processing needs to be changed depending upon whether or not the ball was driven into the hole.

In Step S15 the image command issuing device 6g issues an image command, for the display of a score image, to the image processor 12. Subsequently, the result information setting device 6e feeds character data, representing the number of strokes, to the image processor 12. The image processor 12 in turn causes the score image, representing the result information, to be displayed on the display screen of the television monitor 2. Thereafter, Step S3 follows.

In Step S16, the result information setting device 6e feeds character data, representing a flying distance to the last ball position, to the image processor 12, which in turn causes image data, representing the flying distance to the last ball position, to be displayed on the television monitor 2.

In Step S17, the eye position data setting means 6b substitutes the last ball position data Bxn, Byn, Bzn for the eye position data Ex, Ey Ez. Thereafter, Step S250 follows via the image display processing routine of Step S18. Accordingly, the image is displayed with the last ball position as an eye position.

E. Stance Setting Routine S350 (FIGS. 7 to 8)

Figure 7:
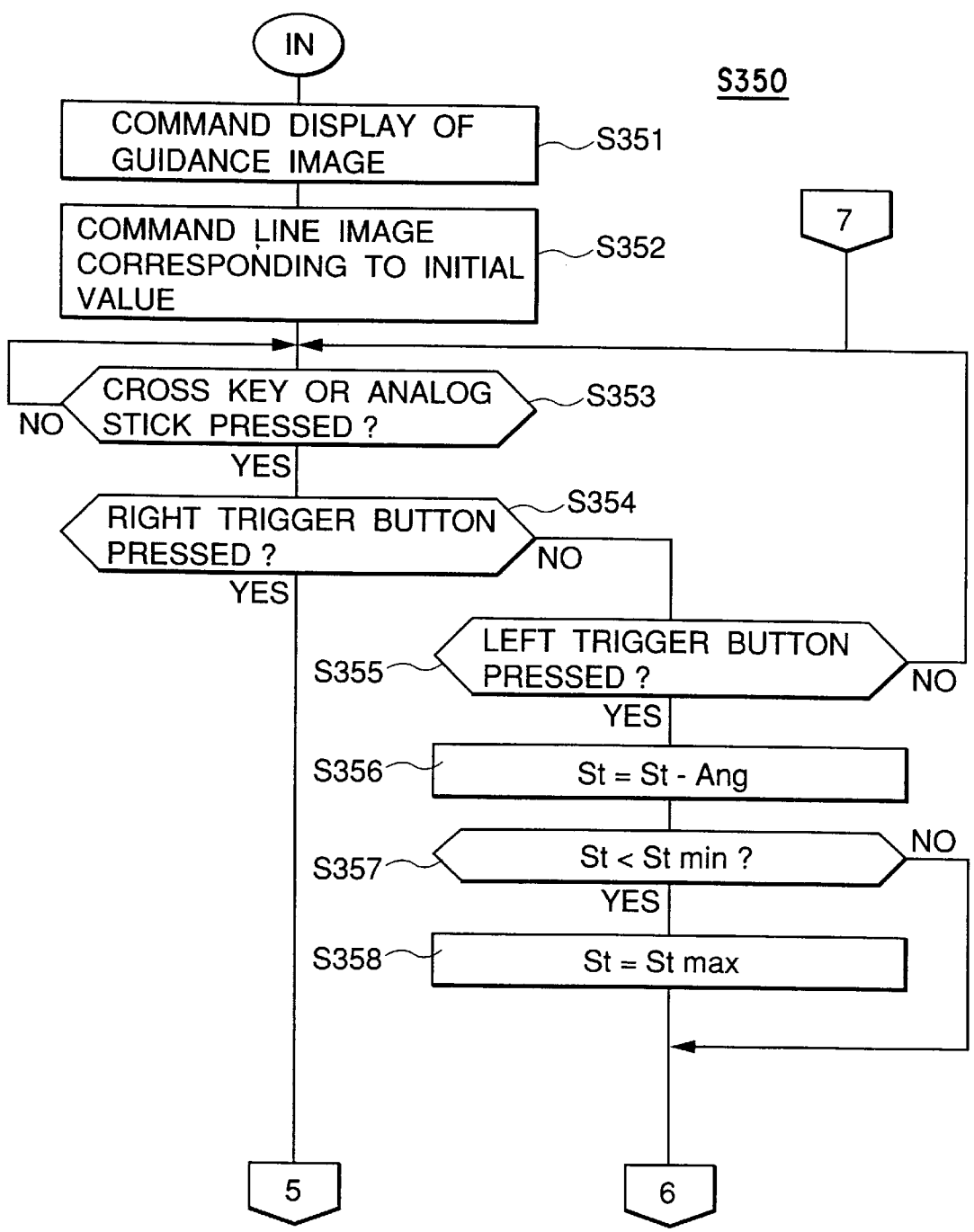
FIGS. 7 and 8 are flowcharts showing an operation sequence of a stance setting routine.
Figure 8:
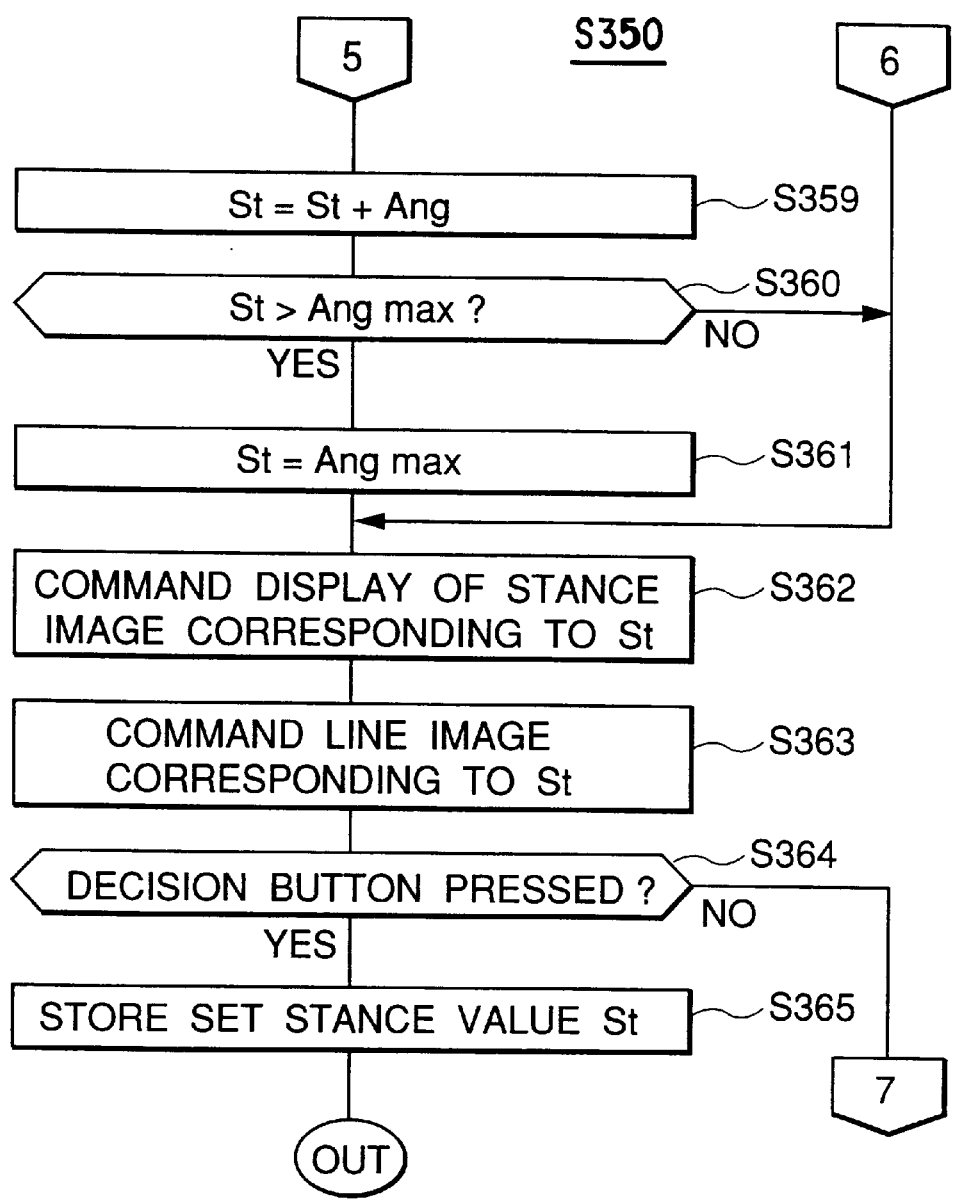

FIGS. 7 and 8 are flowcharts showing operations of the stance setting routine S350. Stance setting refers to the setting of the golfer's position.

In Step S351, the image command issuing device 6g issues an image command for the display of the guidance image to the image processor 12, which in turn causes the guidance image used to set a stance and the guide Gu2 to be displayed in the areas Ar1 and Ar2 on the television monitor 2, respectively.

In Step S352, the image command issuing device 6g issues a line image command corresponding to the initial values to the image processor 12, which in turn writes line data in the RAM 8 from a starting address to an end address in accordance with the line image command. This line is a line In on the guide Gu1 shown in FIG. 3. The guide Gu1 is a reduced image of the currently selected hole, and the line In corresponds to a direction set in the direction setting routine of Step S300. Accordingly, the game player can predict the trajectory, flying distance, spin and stop position of the golfball when he commands the golfer Ma in the golf game space to drive the golfball via the controller 16 with the current settings.

In Step S353, the button operation detecting device 6a discriminates whether the cross button 16d or the analog stick 16e has been pressed. Step S354 follows if the discrimination result is "YES".

In Step S354 the button operation detecting device 6a discriminates whether the right triggerbutton 16g has been pressed. Step S359 follows if the discrimination result is "YES", whereas Step S355 follows if it is "NO".

In Step S355 the button operation detecting device 6a discriminates whether the left trigger button 16f has been pressed. Step S356 follows if the discrimination result is "YES", whereas Step S353, follows if it is "NO".

In Step S356 the calculating device 6d subtracts a reference angle data Ang from a set stance value St.

In Step S357, the discriminating device 6f discriminates whether the set stance value St is smaller than a minimum stance value St min. Step S358 follows if the discrimination result is "YES", whereas Step S362 follows if the discrimination result is "NO".

In Step S358 the variable setting device 6h substitutes a maximum stance value St max for the stance value St.

In Step S359 the calculating device 6d adds the reference angle data Ang to the stance value St.

In Step S360, the discriminating device 6f discriminates whether the set stance value St is larger than a maximum angle data Ang max. Step S361 follows if the discrimination result is "YES", whereas Step S362 follows if the discrimination result is "NO".

In Step S361 the variable setting device 6h sets the stance value St to the maximum angle data Ang max.

In Step S362 the image command issuing device 6g issues to the image processor 12 an image command for the display of a stance image corresponding to the set stance value St. Accordingly, the image in the area Ar1 on the television monitor 2 is displayed so as to correspond to the stance value St set according to the state of the cross key 16d or analog stick 16e.

In Step S363, the image command issuing device 6g issues a line image command to the image processor 12, which in turn writes line data in the RAM 8 from the starting address to the end address. Accordingly, the line In in the guide Gu2 on the television monitor 2 is displayed corresponding to the set stance value St.

In Step S364, the button operation detecting device 6a discriminates whether the decision button 16b has been pressed. Step S365 follows if the discrimination result is "YES", whereas Step S353, follows if the discrimination result is "NO".

In Step S365 the parameter administering device 60 stores in the RAM 8 the set stance value St used to determine the trajectory, flying distance, spin and stop position of the golfball used in the stroke routine S500.

F. Stance Width Setting Routine S370 (FIGS. 9 to 10)

Figure 9:
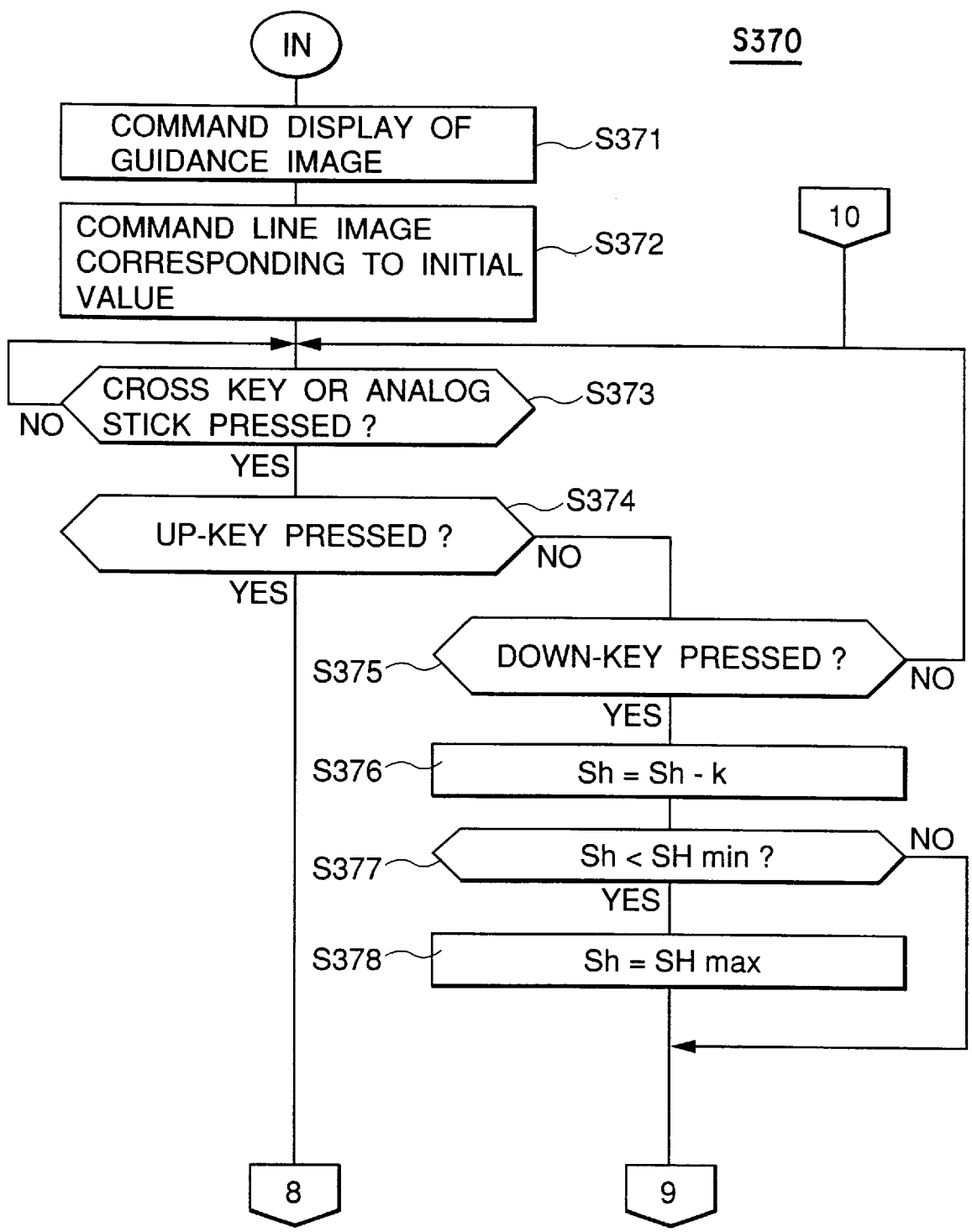
FIGS. 9 and 10 are flowcharts showing an operation sequence of a stance width setting routine.
Figure 10:
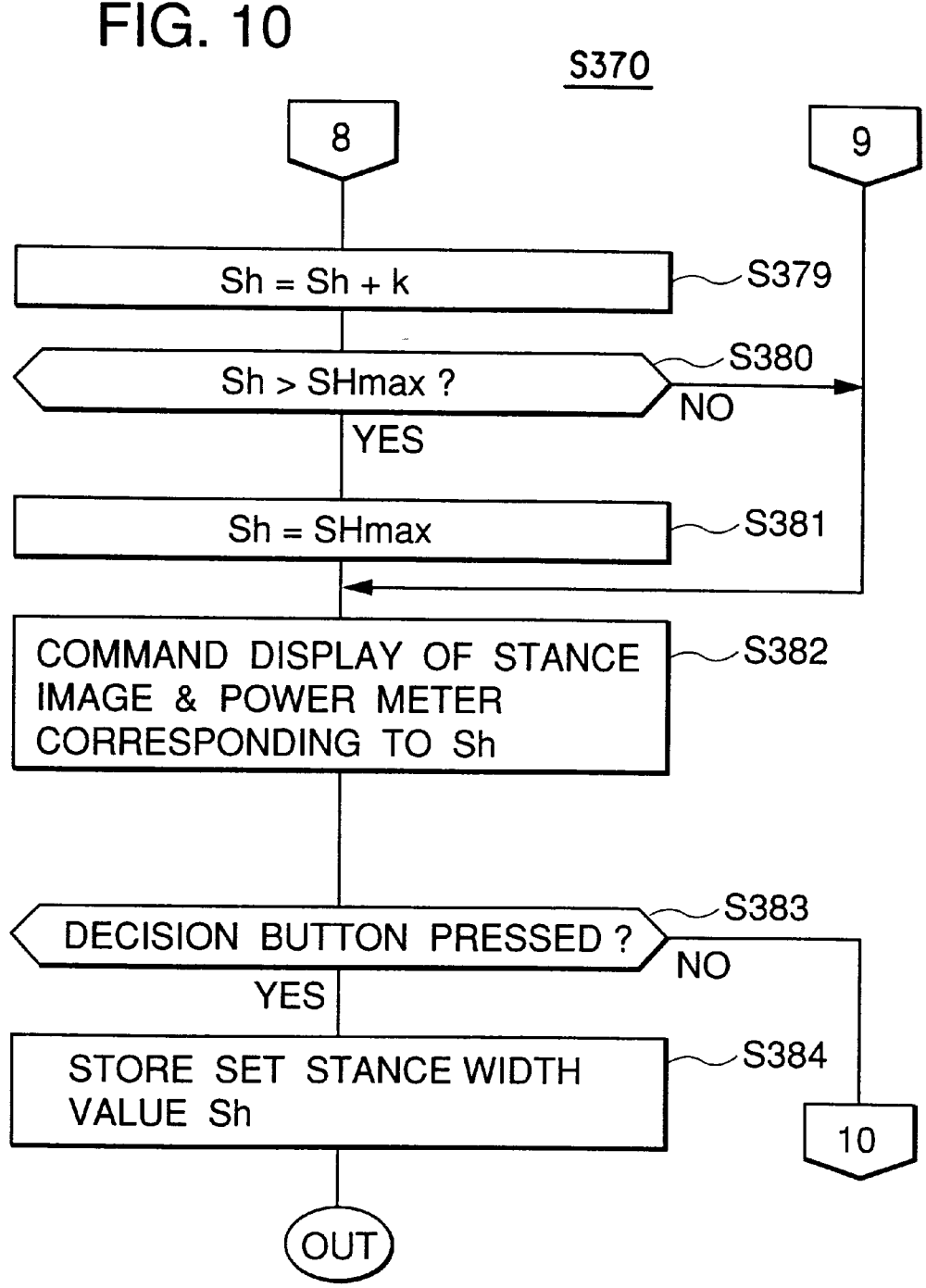

FIGS. 9 and 10 show operations of the stance width setting routine S370. The stance width setting refers to the setting of power at the time of a shot according to the spacing between the feet of the golfer.

In Step S371 the image command issuing device 6g issues an image command for the display of the guidance image to the image processor 12, which in turn causes the guidance image for setting the stance to be displayed in the area AR 1 on the television monitor 2.

In Step S372, the image command issuing device 6g issues a line image command corresponding to the initial value to the image processor 12, which in turn writes line data in the RAM 8 from a starting address to an end address in accordance with the line image command. This line is the line In in the guide Gu2. The guide Gu2 is a reduced image of the currently selected hole. Accordingly, the game player can predict the trajectory, flying distance, spin and stop position of the golfball when he commands the golfer Ma in the golf game space to drive the golfball via the controller 16 with the current settings.

In Step S373, the button operation detecting device 6a discriminates whether the cross key 16d or analog stick 16e has been pressed. Step S374 follows if the discrimination result is "YES".

In Step S374, the button operation detecting device 6a discriminates whether an up-key of the cross key 16d has been pressed. Step S379 follows if the discrimination result is "YES", whereas Step S375 follows if the discrimination result is "NO".

In Step S375, the button operation detecting device 6a discriminates whether a down-key of the cross key 16d has been pressed. Step S376 follows if the discrimination result is "YES", whereas Step S373, follows if the discrimination result is "NO".

In Step S376, the calculating device 6d subtracts a reference value k of the movement of the feet from a set stance width value Sh.

In Step S377, the discriminating device 6f discriminates whether the set stance width value Sh is smaller than a minimum stance width value SH min. Step S378 follows if the discrimination result is "YES", whereas Step S382 follows if the discrimination result is "NO".

In Step S378, the variable setting device 6h substitutes a maximum stance width value SH max for the stance width value Sh.

In Step S379 the calculating device 6d adds the reference value k to the stance width value Sh.

In Step S380, the discriminating device 6f discriminates whether the stance width value Sh is larger than the maximum stance width value SH max. Step S381 follows if the discrimination result is "YES", whereas Step S382 follows if the discrimination result is "NO".

In Step S381, the variable setting device 6h sets the stance width value Sh to the maximum stance width value SH max.

In Step S382 the image command issuing device 6g issues to the image processor 12 an image command for the display of the stance image and the power meter corresponding to the set stance width value Sh, which in turn causes the image in the area Ar1 on the television monitor 2 to correspond to the set stance width value Sh as shown in FIGS. 18A and 18B.

FIG. 18A shows a case where the stance width is widened. In this case, foot marks F, indicating a stance position, are widened and the power meter PM is increased. Further, a range of an impact meter IP is reduced. FIG. 18B shows a case where the stance width is narrowed. In this case, the foot marks F are narrowed and the power meter PM is reduced. Further, the range of the impact meter IP is increased.

In Step S383, the button operation detecting device 6a discriminates whether the decision button 16b has been pressed. Step S384 follows if the discrimination result is "YES", whereas Step S373, follows again if the discrimination result is "NO". The operation of the decision button 16d in Step S364 may be done by the operation of the decision button 16d in Step S383.

In Step S384 the parameter administering device 6o stores in the RAM 8 the set stance width value Sh used to determine the trajectory, flying distance, spin and stop position of the golfball used in the stroke routine S500.

G. Ball Position Setting Routine S420 (FIGS. 11 and 12)

Figure 11:
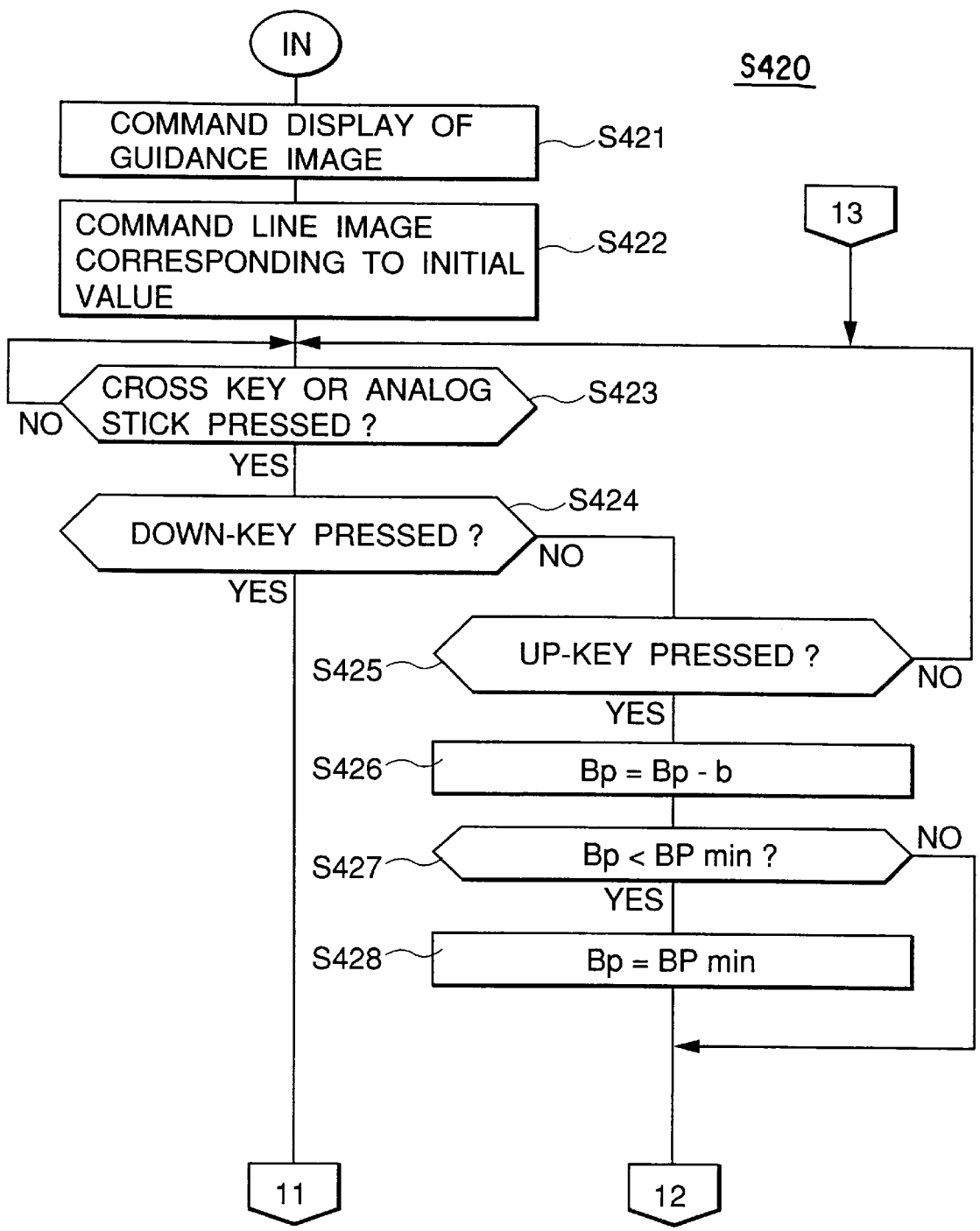
FIGS. 11 and 12 are flowcharts showing an operation sequence of a ball position setting routine.
Figure 12:
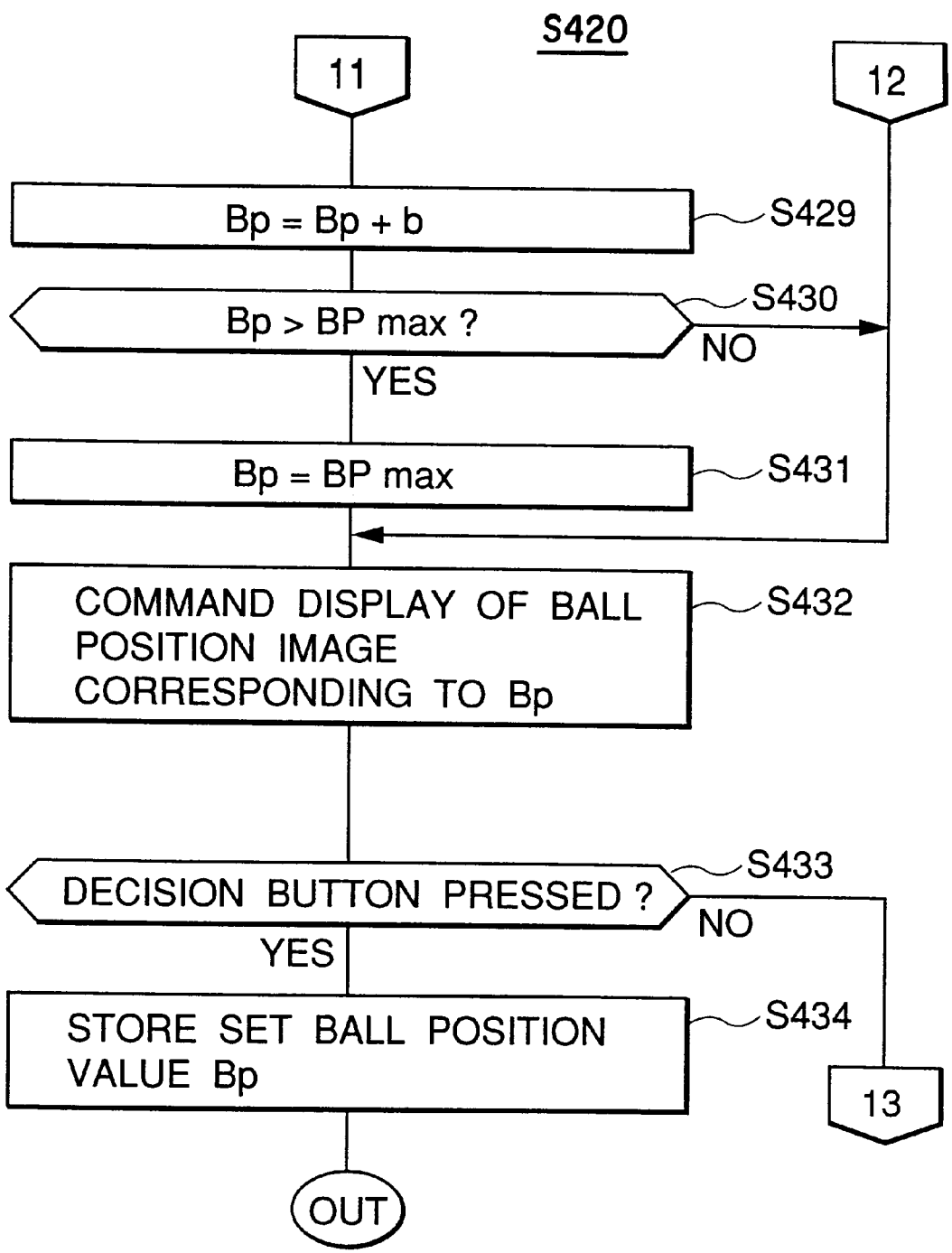

FIGS. 11 and 12 show operations of the ball position setting routine S420. The ball position setting refers to setting the positions of the feet of the golfer with respect to the golfball.

In Step S421, the image command issuing device 6g issues the image command for the display of the guidance image to the image processor 12, which in turn causes the guidance image for setting the positions of the feet of the golfer with respect to the golfball and the guide Gu2 to be displayed in the area Ar1 and the right area on the television monitor 2, respectively.

In Step S422, the image command issuing device 6g issues the line image command to the image processor 12, which in turn writes the line data in the RAM 8 from the starting address to the end address. The line In is accordingly displayed in the guide Gu1 shown in FIG. 3. The guide Gu1 is a reduced image of the currently selected hole and corresponds to the direction set in the direction setting routine of Step S300. Accordingly, the game player can predict the trajectory, flying distance, spin and stop position of the golfball when he commands the golfer Ma in the golf game space to drive the golfball via the controller 16 with the current settings.

In Step S423, the button operation detecting device 6a discriminates whether the cross key 16d or analog stick 16e has been pressed. Step S424 follows if the discrimination result is "YES".

In Step S424 the button operation detecting device 6a discriminates whether the down-key of the cross key 16d has been pressed. Step S429 follows if the discrimination result is "YES", whereas Step S425 follows if the discrimination result is "NO".

In Step S425 the button operation detecting device 6a discriminates whether the up-key of the cross key 16d has been pressed. Step S426 follows if the discrimination result is "YES", whereas Step S423 follows if the discrimination result is "NO".

In Step S426 the calculating device 6d subtracts a foot position reference value b from a set ball position value Bp.

In Step S427, the discriminating device 6f discriminates whether the ball position value Bp is smaller than a minimum ball position value BP min. Step S428 follows if the discrimination result is 'YES", whereas Step S432 follows if the discrimination result is "NO".

In Step S428 the variable setting device 6h substitutes the minimum ball position value BP min for the ball position value Bp In Step S429 the calculating device 6d adds the foot position reference value b to the ball position value Bp In Step S430, the discriminating device 6f discriminates whether the ball position value Bp is larger than a maximum ball position value BP max. Step S431 follows if the discrimination result is "YES., whereas Step S432 follows if the discrimination result is "NO".

In Step S431 the variable setting device 6h substitutes the maximum ball position value BP max for the ball position value Bp In Step S432 the image command issuing device 6g issues an image command for the display of a ball position image corresponding to the set ball position value BP to the image processor 12. The image processor 12 in turn causes the image in the area Ar1 on the television monitor 2 to correspond to the ball position value Bp set in accordance with the state of the cross key 16d or analog stick 16e as shown in FIGS. 17A and 17B.

In Step S433, the button operation detecting device 6a discriminates whether the decision button 16b has been pressed. Step S434 follows if the discrimination result is "YES", whereas Step S423 follows if the discrimination result is "NO".

In Step S434 the parameter administering device 6o stores in the RAM 8 the set ball position value Bp used to determine the trajectory, flying distance, spin and stop position of the golfball used in the stroke routine S500.

H. Club Setting Routine S400 (FIGS. 13 and 14)

Figure 13:
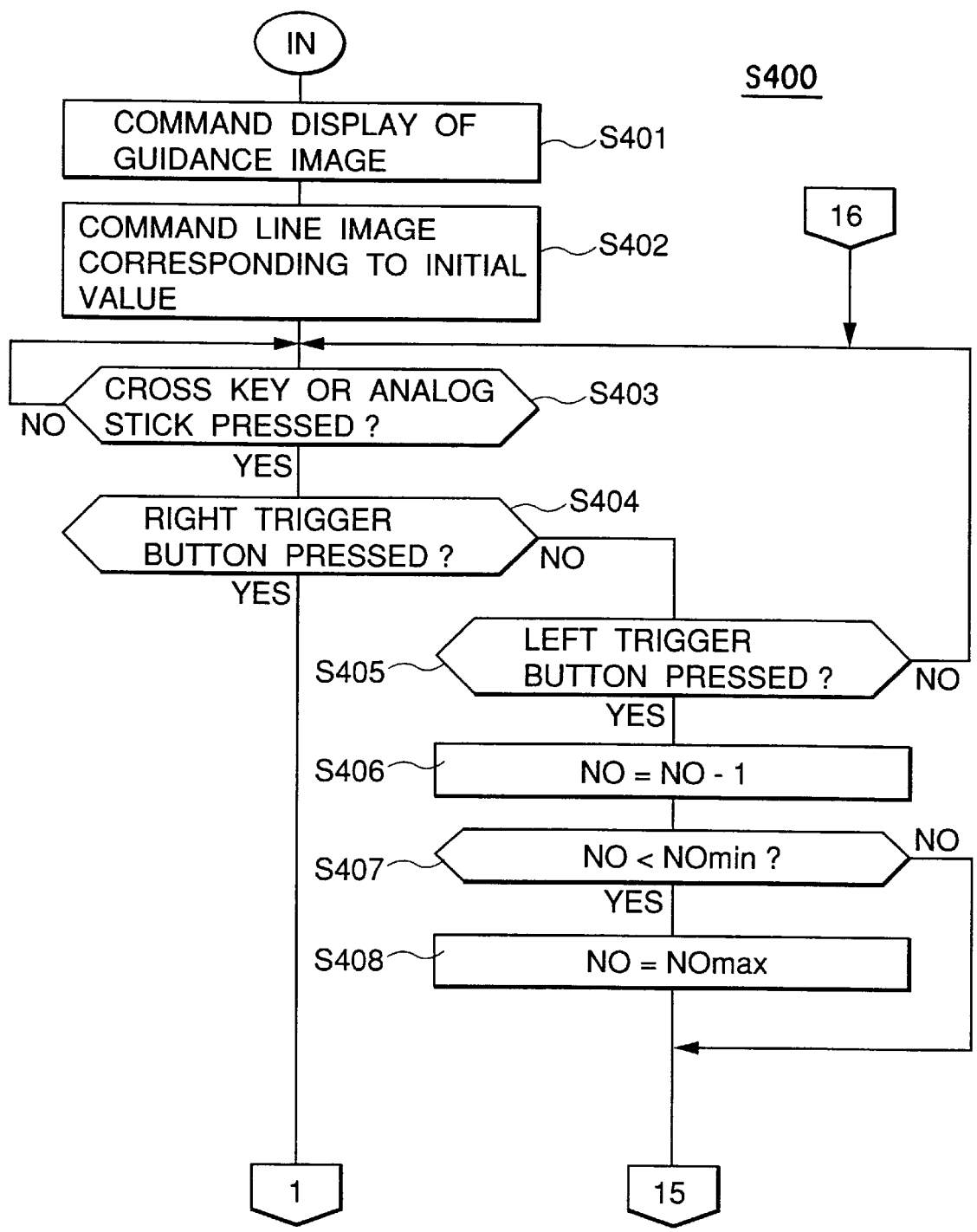
FIGS. 13 and 14 are flowcharts showing an operation sequence of a club setting routine.
Figure 14:
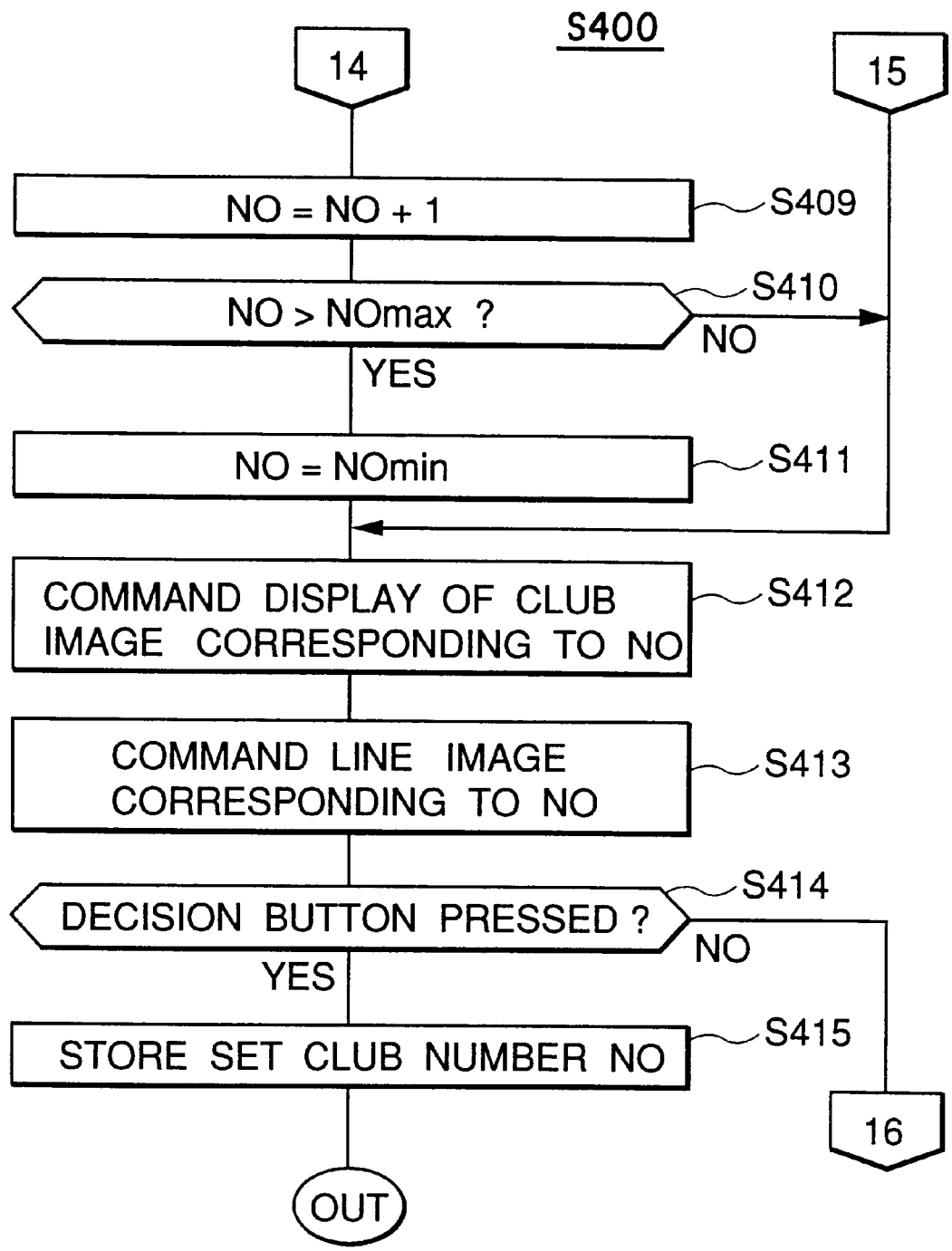

FIGS. 13 and 14 show operations of the club setting routine S400. Club setting refers to the selection of a golf club.

In this processing, club number data is used. A texture address representing an image of one club is allotted to each one of the club number data NO. These data are stored as a table. The club number data NO is incremented or decremented every time the cross key 16d or analog stick 16e is pressed. The texture address corresponding to the value of the club number data NO is fed to the image processor 12, which in turn reads an image data of a club corresponding to the texture address data from a non-display area of the RAM 8 and writes the read image data in a display area of the RAM 8. Thus, the image of the club is displayed in the area Ar3 on the television monitor 2 as shown in FIG. 3.

In Step S401, the image command issuing device 6g issues an image command for the display of the guidance image to the image processor 12, which in turn causes the image of the selected golf club and the line In corresponding to the flying distance of the selected golf club to be displayed in the area Ar3 and in the guide Gu1 the television monitor 2, respectively. Further, the displayed states of the stance width and the power meter PM in the area Ar1 correspond to the initial value of the selected golf club.

In Step S402, the image command issuing device 6g issues a line image command corresponding to the initial value to the image processor 12, which in turn writes a line data in the RAM 8 from a starting address to an end address in accordance with the line image command. The line In is accordingly displayed in the guide Gu1. Accordingly, the game player can predict the trajectory, flying distance, spin and stop position of the golfball when he commands the golfer Ma in the golf game space to drive the golfball via the controller 16 with the current settings.

In Step S403, the button operation detecting device 6a discriminates whether the cross key 16d or analog stick 16e has been pressed. Step S404 follows if the discrimination result is "YES".

In Step S404 the button operation detecting device 6a discriminates whether the right trigger button 16g of the controller 16 has been pressed. Step S404 follows if the discrimination result is "YES", whereas Step S405 follows if the discrimination result is "NO".

In Step S405 the button operation detecting device 6a discriminates whether the left trigger button 16f of the controller 16 has been pressed. Step S406 follows if the discrimination result is "YES", whereas Step S403, follows if the discrimination result is "NO".

In Step S406 the calculating device 6d subtracts "1" from the club number data NO.

In Step S407, the discriminating device 6f discriminates whether the value of the club number data NO is smaller than a minimum vale NO min. Step S408 follows if the discrimination result is "YES", whereas Step S412 follows if the discrimination result is "NO".

In Step S408 the variable setting device 6h substitutes a maximum value NO max of the club number data NO for the club number data NO.

In Step S409, the calculating device 6d adds "1" to the club number data NO.

In Step S410, the discriminating device 6f discriminates whether the club number data NO is larger than the maximum value NO max. Step S411 follows if the discrimination result is "YES", whereas Step S412 follows if the discrimination result is "NO".

In Step S411, the variable setting device 6h substitutes the minimum value NO min for the club number data NO.

In Step S412 the image command issuing device 6g issues to the image processor 12 an image data for the display of the image of the club corresponding to the set value of the club number data NO, which in turn causes the image of the club corresponding to the value of the club number data NO to be displayed in the area Ar3 on the television monitor 2. Further, the displayed states of the stance width and the power meter PM in the area Ar1 correspond to the initial value of the selected golf club.

In Step S413, the image command issuing device 6g issues a line image command to the image processor 12, which in turn writes a line data in the RAM 8 from a starting address to an end address in accordance with the line image command. Accordingly, the displayed state of the line In in the guide Gu2 also corresponds to the value of the club number data NO.

In Step S414, the button operation detecting device 6a discriminates whether the decision button 16b has been pressed. Step S415 follows if the discrimination result is "YES", whereas Step S403, follows if the discrimination result is "NO".

In Step S415, the parameter administering device 6o stores the set club number data NO in the RAM 8.

I. Stroke Routine S500 (FIGS. 15 and 16)

FIGS. 15 and 16 show operations of the stroke routine S500. The term "stroke" means to operate the golfer Ma to drive the golfball by the operation of the controller 16 by the game player. In this "stroke" routine, the image display processing is performed until the golfball driven by the golfer Ma in the golf game falls and stops in the game space.

In Step S501, the image command issuing device 6g issues to the image processor an image command for the display of the image of the power meter PM which serves as a guide for the stroke, which in turn writes the image data of the power meter PM into the RAM 8 in accordance with the image command.

The power meter PM is an image that shows the game player the degree of strength (hereinafter, "energy") of the stroke by his operation when he operates the controller 16 to make the golfer Ma in the golf game space drive the golfball. In this power meter PM, the power of the stroke is at maximum at the bottom as shown in FIGS. 19A and 19B.

Figure 19A:
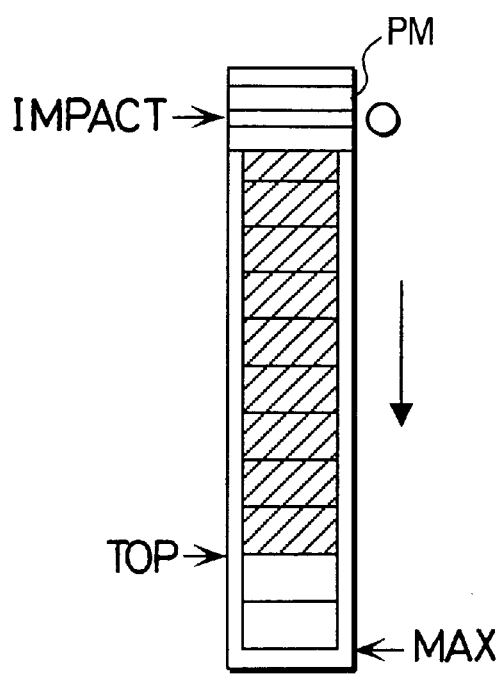
FIGS. 19A and 19B are diagrams showing display examples of the power meter during the stroke processing.
Figure 19B:
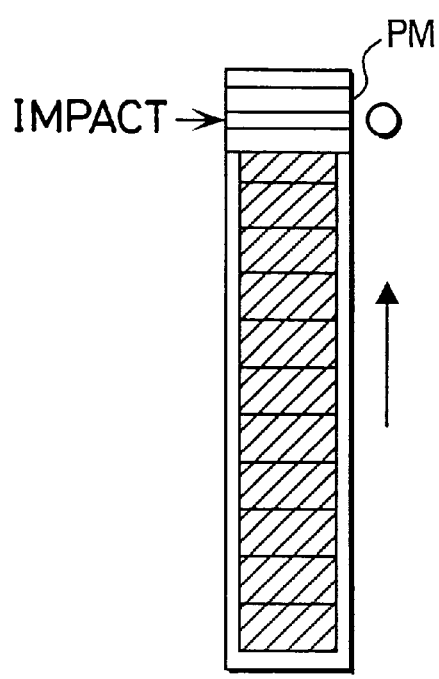

While the decision button 16b is pressed with the power meter PM displayed, boxes inside the power meter PM are successively colored in a direction of the arrow of FIGS. 19A from an impact position to aposition ofmaximum power. At this time, the respective boxes are colored by different colors of, e.g., yellow, light blue, blue, purple and red. The leading end of the colored portion indicates the energy of the stroke at that time. Accordingly, the longer the decision button 16b is pressed, the larger the energy of the stroke.

On the other hand, when the decision button 16b is released in the above state, this timing is assumed to be a top position. The colored boxes of the power meter PM are successively colored by a different color. In the above example, the colored portion is further colored by a different color of, e.g., orange from the position of maximum power to the impact position as indicated in FIG. 19B. The leading end of the doubly colored portion indicates the energy of the stroke at that time. Once the decision button 16d is released, the stroke energy is decided. Thereafter, the power meter PM is doubly colored toward the impact position. If the decision button 16b is pressed again where the leading end of the doubly colored portion maximally approaches the impact position, the stroke is made with the stroke energy decided before. The above description corresponds to Steps S501, S505 to S511 of the flowchart shown in FIG. 15.

In Step S502, the random number generating device 6p randomly generates values representing a wind direction WDi and a wind velocity Wp.

In Step S503 the image command issuing device 6g issues to the image processor 12 an image command for the display of character data and the image of an arrow corresponding to the values of the wind direction WDi and the wind velocity Wp, which in turn writes the data representing the wind velocity, title and arrow respectively in the RAM 8 in accordance with the received image command. As a result, as shown in FIG. 3, the images of the arrow indicating the wind direction and the value of the wind velocity ("4 m" in this example) are displayed on the television monitor 2.

In Step S504, the parameter administering device 6o stores the wind direction data WDi and the wind velocity data Wp in the RAM 8.

In Step S505, the button operation detecting device 6a discriminates whether the decision button 16b has been pressed. Step S506 follows if the discrimination result is "YES", whereas Step S501 follows if the discrimination result is "NO".

In Step S506, the calculating device 6d adds the reference value k to a stroke energy data POWER based on the set club and stance width.

In Step S507, the image command issuing device 6g issues a line image command corresponding to the value of the stroke energy data POWER to the image processor 12. The line image command is for drawing lines in a designated color inside the power meter PM. The image processor 12 writes line data on the power meter PM written in the RAM 8 so much as to correspond to the value of the stroke energy data POWER in accordance with the line image command. As a result, the inside of the power meter PM is colored by specified colors.

In Step S508, the button operation detecting device 6a discriminates whether the decision button 16b has been pressed. Step S509 follows if the discrimination result is "YES", whereas Step S506 follows if the discrimination result is "NO".

In Step S509 the calculating device 6d calculates the reference value k based on the stroke energy data POWER.

In Step S510 the image command issuing device 6g issues to the image processor 12 a line image command corresponding to the value of the energy data POWER, which in turn writes line data as indicated by the value of the stroke energy data POWER on the power meter PM written on the RAM 8 in accordance with the line image command. Accordingly, the inside of the power meter PM displayed is doubly colored with a specified color. The double coloring of the inside of the power meter PM in Step S510 extends from the energy position when the decision button 16b is released in a direction opposite from the case where the decision button 16b is being pressed.

In Step S511, the button operation detecting device 6a discriminates whether the decision button 16b has been pressed. Step S512 follows if the discrimination result is "YES", whereas Step S509 follows if the discrimination result is "NO". If the decision button 16b is pressed in this state, the stroke energy data POWER at this time is decided. This stroke energy data POWER is corrected based on the impact position.

In Step S512 the calculating device 6d adds "1" to a stroke data Hi, and the parameter administering device 60 stores the stroke data Hi in the RAM 8.

In Step S513, the image command issuing device 6g successively issues image commands for the display of the image of the golfer Ma to the image processor 12, which in turn successively develops the image of the golfer Ma in the RAM 8 in the image commands. As a result, a series of images of the golfer Ma are displayed until the golf swing is finished. It should be noted that the animation processing of the golfer of Step S513, may also be performed in Step S510.

In Step S514, the calculating device 6d calculates all ball positions Bx, By, Bz per unit time based on the ball positions Bx, By, Bz, the stroke energy data POWER, the tee-up data Ty, the direction data Di, the stance data St, the club number data NO, the wind direction data WDi and the wind velocity data Wp. The unit time refers to 30 frames/sec. in, for example, a television system of NTSC. Thus, in this case, the position of the ball per frame is obtained in advance.

A time which lasts until the ball stops differs depending on the above parameters. Accordingly, if the position of the ball per frame is obtained, and one frame of image corresponding to that ball position is displayed, the number of frames of images to be displayed until the ball stops differs. The number of frames of images until the ball stops is stored as nmax in the RAM 8.

In Step S515, the calculating device 6d adds f to a variable n. Here, f refers to, e.g., one frame.

In Step S516, the discriminating device 6f discriminates whether the variable n is larger than a maximum value nmax. Step S517 follows if the discrimination result is "YES", whereas Step S518 follows if it is "NO". As described above, nmax is the number of frames of images to be displayed until the golfball stops.

In Step S517 the variable setting device 6h substitutes "0" for a variable h.

In Step S518 the image command issuing device 6g issues to the image processor 12 an image command for the display of the image of the ball at the ball position data Bxn, Byn, Bzn.

In Step S519, the button operation detecting device 6a discriminates whether the decision button 16b has been pressed. This routine is exited if the discrimination result is "YES", whereas Step S520 follows if the discrimination result is "NO".

In Step S520 the calculating device 6d adds f to the variable n.

In Step S521, the discriminating device 6f discriminates whether the variable n is larger than the maximum value nmax. The stroke routine is exited if the discrimination result is "YES", whereas Step S522 follows if it is "NO".

In Step S522, the variable setting device 6h substitutes the ball position data Bxn, Byn, Bzn for the eye position data Ex, Ey, Ez.

In Step S100, the image display processing routine is performed. Steps S520 to S100 are performed to reproduce the flying state of the driven golfball. The ball position varies every moment for each frame. Accordingly, by substituting the ball position data Bxn, Byn, Bzn for the eye position data Ex, Ey, Ez, the eye position varies every moment, thereby changing the background image every moment. Thus, a so-called replay image is displayed.

As described above, according to this embodiment, the result of the shot to be made can be changed by changing the "spacing between the feet", "direction of the feet" and "the position of the golfball" when the golfer Ma takes a stance. More specifically, the spacing between the feet determines the power of the shot, which influences the flying distance of the golfball. By changing the width of the power meter, the game player is caused to realize the spacing between the feet substantially influences the result. When the power meter is changed by changing the spacing between the feet, a range used gauge an impact timing is increased or decreased, thereby influencing the degree of difficulty in gauging a timing. This makes the stability of the shot similar to that of real golf. Further, in this embodiment, the spin of the golfball is changed by the position of the ball. For example, back spin is likely to be given to the ball if the ball is positioned near the right foot, making the shot a so-called "punch shot" having a low trajectory. Such a shot is unlikely to be influenced by the wind, even when the wind is against it. By positioning the ball near the left foot, the shot can be made to fly high and the flying distance can be controllably lengthened with the wind when the wind is behind it. Thus, the trajectory of the golfball is changed depending on how the stance is taken similar to real golf, thereby realizing a more real golf system.

In the foregoing embodiment, the spacing between the feet is changed to change the power of the shot as a factor for determining the flying distance of the golfball. However, the velocity of a swing may be added as a factor for determining the flying distance of the golfball. In the foregoing embodiment, the maximum value of the power of the shot is determined by the spacing between the feet, and an amount of power given to make an actual shot is determined at the top of swing position in the subsequent stroke routine. The velocity of the swing is added as an auxiliary parameter for determining how the determined amount of power can be efficiently used. If the velocity of the swing is used to correct the power of the shot, it can be expected that a shot can be more strategically made and that the game player can feel more as if here were actually playing golf. A variety of techniques for setting the velocity of the swing are considered. For example, it may be determined by the degree of inclination of the analog stick 16e. A control may be made such that the higher swing velocity leads to a longer flying distance, but also to an increased degree of difficulty in taking a timing. For such a control, the velocity at which the meter is colored on the screen at the time of a down swing is changed according to the swing velocity, thereby simply changing the feeling the game player has during the operation to change a degree of difficulty in taking a timing.

According to the present invention, the stance is adjusted by the player and a changed state of the stance is displayed on a display screen. Accordingly, the game player can easily recognize, based on which stance is used, how the game is going to play, with the result that he can feel more as if he were actually playing golf Also, the guide is given by displaying the spacing between the feet in the stance and displaying the power meter whose scale increases and decreases according to the spacing between the feet. Accordingly, the result of the shot to be made can be changed according to the "spacing between the feet" in the stance. Thus, the spacing between the feet determines the power applied to the shot and influences the flying distance of the golfball, thereby making the game more real. By changing the width of the power display, the game player can be made to realize that the spacing between the feet substantially influences the result of the shot.

Further, when the power display is changed by changing the spacing between the feet, the range used to gauge an impact timing is increased and decreased. Thus, the stability of the shot can be made similar to that of real golf by influencing the degree of difficulty in gauging a timing.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A simulative golf game system comprising:

an operation unit for generating an operation signal for controlling a stance setting in accordance with manual operation of the operation unit by a player;

a game image producing unit for producing game images having a guide image indicating the stance setting set, including a spacing between feet of the player, in accordance with the operation signal from the operation unit, the game image producing unit including:

a flight distance calculator for calculating a flying distance of a golfball based on the stance setting including the spacing between the feet; and the game image producing unit producing a game image depicting the flying distance of the golfball; and a display unit for displaying the game images.

2. The simulative golf game system according to claim 1, wherein the stance setting includes setting a position of the feet with respect to a golfball, and the game image producing unit produces a game image having a feet position guide image indicating the position of the feet with respect to the golfball.

3. The simulative golf game system according to claim 2, wherein the game image producing unit further includes a trajectory calculator for calculating a trajectory of the golfball based on the position of feet with respect to the golfball, and produces a game image indicating a calculated, trajectory of the golfball.

4. A simulative golf game system, comprising:

an operation unit for generating an operation signal for controlling a stance setting in accordance with manual operation of the operation unit by a player, the stance setting including setting a spacing between feet of the player;

a game image producing unit for producing game images having a guide image indicating the stance setting set in accordance with the operation signal from the operation unit wherein the guide image indicates the spacing between the feet of the player;

the game image producing unit including a flight distance calculator for calculating a flying distance of a golfball in accordance with the stance setting, and producing a game image depicting the flying distance of the golfball; and the game image producing unit further including a power calculator for calculating a shot power based on the spacing between the feet, and producing a game image having a power guide image indicating the shot power calculated.

5. The simulative golf game system according to claim 4, wherein the game image producing unit further includes an impact timing range calculator for calculating an impact timing range based on the spacing between the feet, and produces a game image having a timing range guide image indicating the impact timing range.

6. A method for simulating a golf game comprising the steps of:

accepting input establishing a stance setting including a spacing between feet of a player;

producing game images having a guide image indicating the stance setting including the spacing between the feet of the player;

calculating a flying distance of a golfball based on the stance setting including the spacing between the feet;

producing a game image indicating the flying distance of the golfball; and displaying the game images.

7. The method according to claim 6, further comprising the steps of:

accepting input establishing a position of the feet with respect to the golfball; and producing a game image having a feet position guide image indicating the position of feet with respect to the golfball that is established.

8. The method according to claim 7, further comprising the steps of:

calculating a trajectory of the golfball based on the position of the feet with respect to the golfball; and producing a game image indicating the trajectory of the golfball calculated.

9. A method for simulating a golf game comprising the steps of:

accepting input establishing a stance setting including a spacing between feet of a player;

calculating a flying distance of a golfball based on the stance setting including the spacing between the feet;

calculating a shot power based on the spacing between the feet;

producing game images having a stance guide image indicating the stance setting, including the spacing between the feet of the player;

producing a game image indicating the flying distance of the golfball;

producing a game image having a shot power guide image indicating the shot power calculated; and displaying the game images.

10. The method according to claim 9, further comprising the steps of:

calculating an impact timing range based on the spacing between the feet; and producing a game image having a timing range guide image indicating the impact timing range calculated.

11. A computer readable storage medium storing a simulative golf game program in executable code which renders a computer having a display and an input device to execute the procedures of:

accepting input from the input device establishing a stance setting including a spacing between feet of a player;

producing game images having a guide image indicating the stance setting including the spacing between the feet of the player;

calculating a flying distance of a golfball based on the stance setting including the spacing between the feet;

producing a game image indicating the flying distance of the golfball; and displaying the game images on the display.

12. The computer readable storage medium according to claim 11, and the program further includes the procedures of:

accepting input establishing aposition of the feet with respect to the golfball; and producing a game image having a feet position guide image indicating the position of feet with respect to the golfball that is established.

13. The computer readable storage medium according to claim 12, wherein the program further includes the procedures of:

calculating a trajectory of the golfball based on the position of the feet with respect to the golfball; and producing a game image indicating the trajectory of the golfball calculated.

14. A computer readable storage medium storing a simulative golf game program in executable code which renders a computer having a display and an input device to execute the procedures of:

accepting input establishing a stance setting including a spacing between feet of a player;

calculating a flying distance of a golfball based on the stance setting including the spacing between the feet;

calculating a shot power based on the spacing between the feet;

producing game images having a stance guide image indicating the stance setting, including the spacing between the feet of the player;

producing a game image indicating the flying distance of the golfball;

producing a game image having a shot power guide image indicating the shot power calculated; and displaying the game images.

15. The computer readable storage medium according to claim 14, wherein the program further includes the procedures of:

calculating an impact timing range based on the spacing between the feet; and producing a game image having a timing range guide image indicating the impact timing range calculated.

16. A simulative golf game system comprising:

an operation unit for generating an operation signal regarding a stance setting in accordance with an operation of a player;

a game image producing unit for producing a game image having a guide image representing a stance setting in accordance with an operation signal from the operation unit, the game image producing unit including a flight distance calculator for calculating a flying distance of a golfball based on the stance setting including the spacing between the feet; and a display unit for displaying a produced game image having a guide image.

17. The simulative golf game system according to claim 16, wherein the game image producing unit produces a game image depicting the flying distance of the golfball.

18. The simulative golf game system according to claim 17, wherein the game image producing unit further includes a power calculator for calculating a shot power based on the spacing between the feet, and producing a game image having a power guide image indicating the shot power calculated.

19. A simulative golf game system comprising:

an operation unit for generating an operation signal for controlling a stance setting in accordance with manual operation of the operation unit by a player;

a game image producing unit for producing game images having a guide image indicating the stance setting set, including a spacing between feet of the player, in accordance with the operation signal from the operation unit;

the game image producing unit further including a power calculator for calculating a shot power based on the spacing between the feet, and producing a game image having a power guide image indicating the shot power calculated; and a display unit for displaying the game images.

20. A method for simulating a golf game comprising the steps of:

accepting input establishing a stance setting including a spacing between feet of a player;

producing game images having a guide image indicating the stance setting including the spacing between the feet of the player;

calculating a shot power based on the spacing between the feet;

producing a game image having a shot power guide image indicating the shot power calculated; and displaying the game images.

21. A computer readable storage medium storing a simulative golf game program in executable code which renders a computer having a display and an input device to execute the procedures of:

accepting input from the input device establishing a stance setting including a spacing between feet of a player;

producing game images having a guide image indicating the stance setting including the spacing between the feet of the player;

calculating a shot power based on the spacing between the feet;

producing a game image having a shot power guide image indicating the shot power calculated; and displaying the game images on the display.

* * * * *